(12) United States Patent
Imai et al.

(10) Patent No.: US 10,307,827 B2
(45) Date of Patent: Jun. 4, 2019

(54) TOOL HOLDER

(71) Applicant: MITSUBISHI MATERIALS CORPORATION, Tokyo (JP)

(72) Inventors: Yasuharu Imai, Tokyo (JP); Hidebumi Takahashi, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 31 days.

(21) Appl. No.: 15/539,809

(22) PCT Filed: Jan. 15, 2016

(86) PCT No.: PCT/JP2016/051100
§ 371 (c)(1),
(2) Date: Jun. 26, 2017

(87) PCT Pub. No.: WO2016/117461
PCT Pub. Date: Jul. 28, 2016

(65) Prior Publication Data
US 2017/0368612 A1    Dec. 28, 2017

(30) Foreign Application Priority Data

Jan. 23, 2015    (JP) .................................. 2015-011384

(51) Int. Cl.
*B23B 27/10* (2006.01)
*B23Q 11/10* (2006.01)

(52) U.S. Cl.
CPC .............. *B23B 27/10* (2013.01); *B23Q 11/10* (2013.01); *B23B 2250/12* (2013.01)

(58) Field of Classification Search
CPC ...... B23B 2250/12; B23B 27/10; B23Q 11/10
See application file for complete search history.

(56) References Cited

U.S. PATENT DOCUMENTS 2,641,047 A * 6/1953 Jackman ................. B23B 27/10
407/11
3,077,802 A * 2/1963 Philip ..................... B23B 27/10
407/11

(Continued)

FOREIGN PATENT DOCUMENTS

| CN | 101541455 A | 9/2009 | |
|---|---|---|---|
| DE | 3004166 A1 * | 8/1980 | ............. B23B 27/10 |

(Continued)

OTHER PUBLICATIONS

Supplementary European Search Report dated Aug. 31, 2018 for the European patent application No. 16740068.8.

(Continued)

*Primary Examiner* — Sara Addisu
(74) *Attorney, Agent, or Firm* — Locke Lord LLP

(57) ABSTRACT

An object is to provide a tool holder that can efficiently supply a coolant to a flank and a cutting edge by preventing the leakage of a coolant and can accurately and stably supply a coolant so as to correspond to the shapes of various cutting edges or the types of cutting. A face, a flank, and a cutting edge forming an intersection ridge between the face and the flank are disposed at a leading end portion of a shaft-shaped tool body in a tool holder. A coolant supply passage is formed in the tool body, and a coolant ejection member is detachably provided at the leading end portion of the tool body. The coolant ejection member includes a tubular portion, and an ejection hole that communicates with the coolant supply passage through the inside of the tubular portion and opens toward the flank and the cutting edge.

9 Claims, 25 Drawing Sheets

(56) References Cited

U.S. PATENT DOCUMENTS

| | | | | |
|---|---|---|---|---|
| 3,971,114 | A * | 7/1976 | Dudley | B23B 27/10 407/120 |
| 4,535,216 | A * | 8/1985 | Cassidenti | B23B 1/00 219/68 |
| 5,237,894 | A * | 8/1993 | Lindeke | B23B 27/10 407/11 |
| 5,340,242 | A | 8/1994 | Armbrust et al. | |
| 5,439,327 | A * | 8/1995 | Wertheim | B23B 27/045 407/11 |
| 5,775,854 | A * | 7/1998 | Wertheim | B23B 27/04 407/11 |
| 6,053,669 | A * | 4/2000 | Lagerberg | B23B 27/10 407/11 |
| 9,656,324 | B2 * | 5/2017 | Boissonnet | B23B 29/043 |
| 9,925,596 | B2 * | 3/2018 | Johansson | B23B 27/143 |
| 10,029,313 | B2 * | 7/2018 | Kaufmann | B23B 27/10 |
| 2001/0007215 | A1 * | 7/2001 | Murata | B23B 27/10 83/16 |
| 2006/0053987 | A1 * | 3/2006 | Ghosh | B23B 27/10 82/1.11 |
| 2006/0159529 | A1 | 7/2006 | Haenle et al. | |
| 2008/0124180 | A1 | 5/2008 | Breisch | |
| 2009/0245949 | A1 * | 10/2009 | Takahashi | B23B 27/145 407/42 |
| 2009/0320655 | A1 * | 12/2009 | Grant | B23B 27/10 82/50 |
| 2010/0254772 | A1 * | 10/2010 | Rozzi | B23B 27/10 407/11 |
| 2011/0020072 | A1 * | 1/2011 | Chen | B23B 27/10 407/11 |
| 2011/0305531 | A1 | 12/2011 | Amstibovitsky et al. | |
| 2013/0251463 | A1 * | 9/2013 | Harif | B23B 27/04 407/11 |
| 2016/0339523 | A1 * | 11/2016 | Graf | B23B 27/10 |

FOREIGN PATENT DOCUMENTS

| | | | |
|---|---|---|---|
| DE | 10157450 A1 | 6/2003 | |
| EP | 0100376 A2 * | 2/1984 | B23B 27/10 |
| EP | 0791420 A1 | 8/1997 | |
| FR | 2244590 A1 * | 4/1975 | B23B 27/10 |
| JP | 60127904 A * | 7/1985 | B23B 27/10 |
| JP | 06-031502 A | 2/1994 | |
| JP | 07227702 A * | 8/1995 | |
| JP | 07237006 A * | 9/1995 | |
| JP | 08025111 A * | 1/1996 | |
| JP | 08039387 A * | 2/1996 | |
| JP | H09-183002 A | 7/1997 | |
| JP | 10-076404 A | 3/1998 | |
| JP | 10076404 A * | 3/1998 | B23B 27/10 |
| JP | 2003266208 A * | 9/2003 | |
| JP | 2006136953 A * | 6/2006 | |
| JP | 2013-49106 A | 3/2013 | |
| WO | 2011/154933 A1 | 12/2011 | |

OTHER PUBLICATIONS

International Search Report dated Feb. 9, 2016, issued for PCT/JP2016/051100.

* cited by examiner

[FIG. 1]
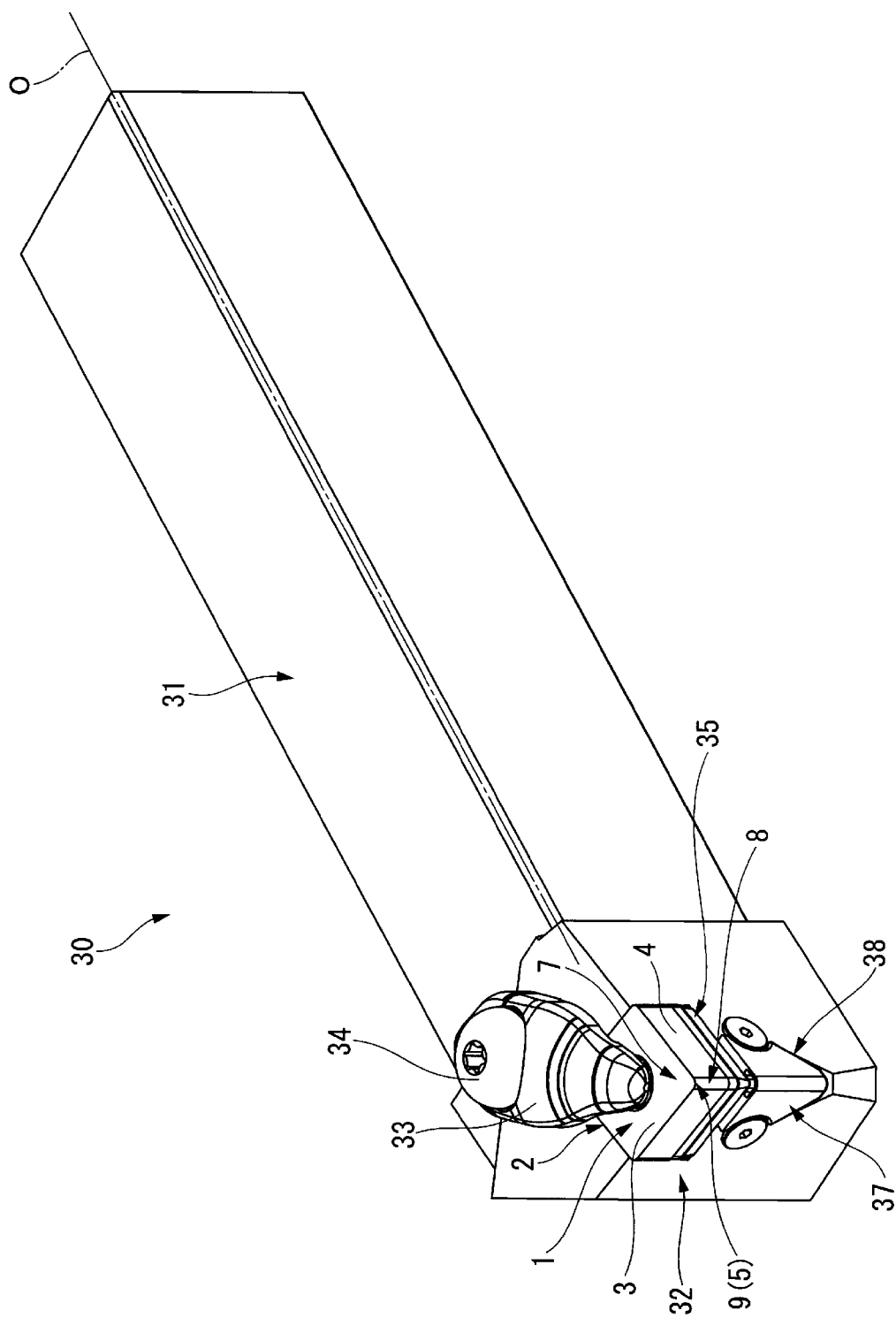

[FIG. 2]
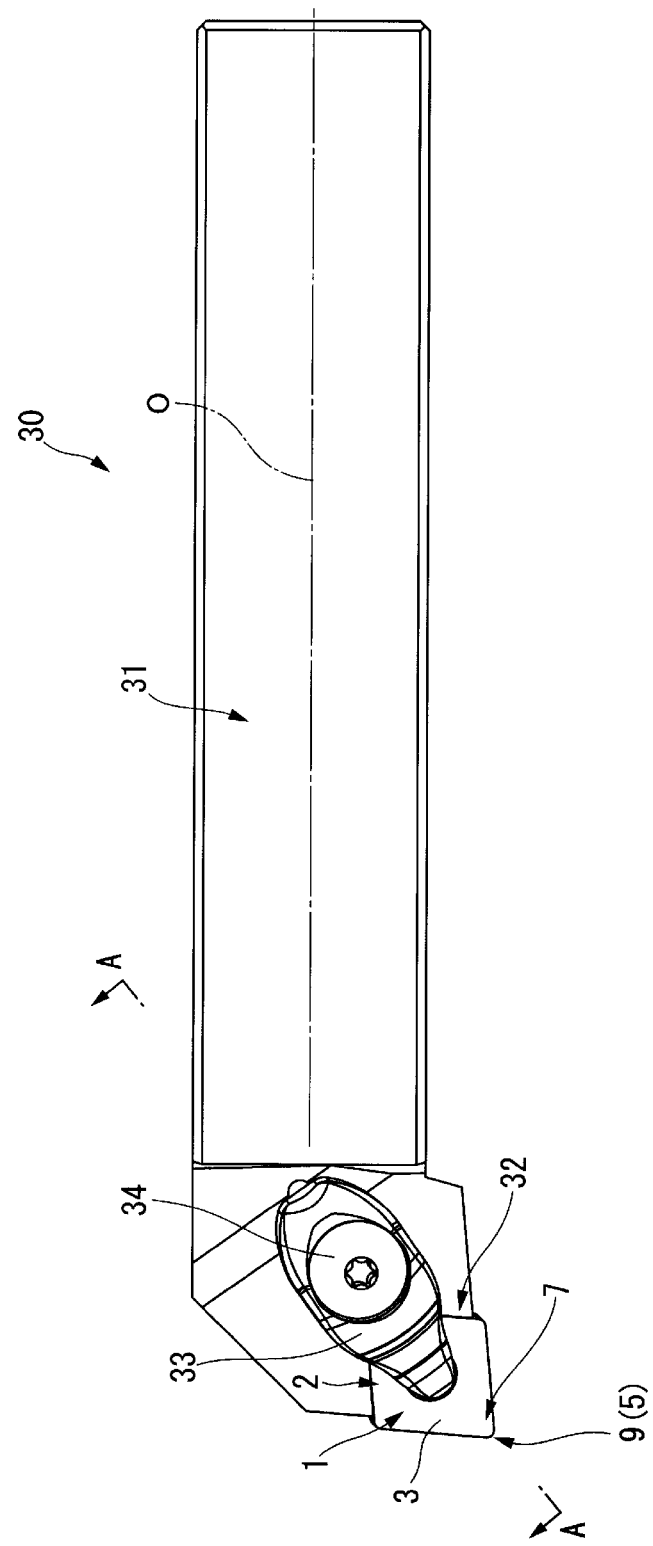

[FIG. 3]
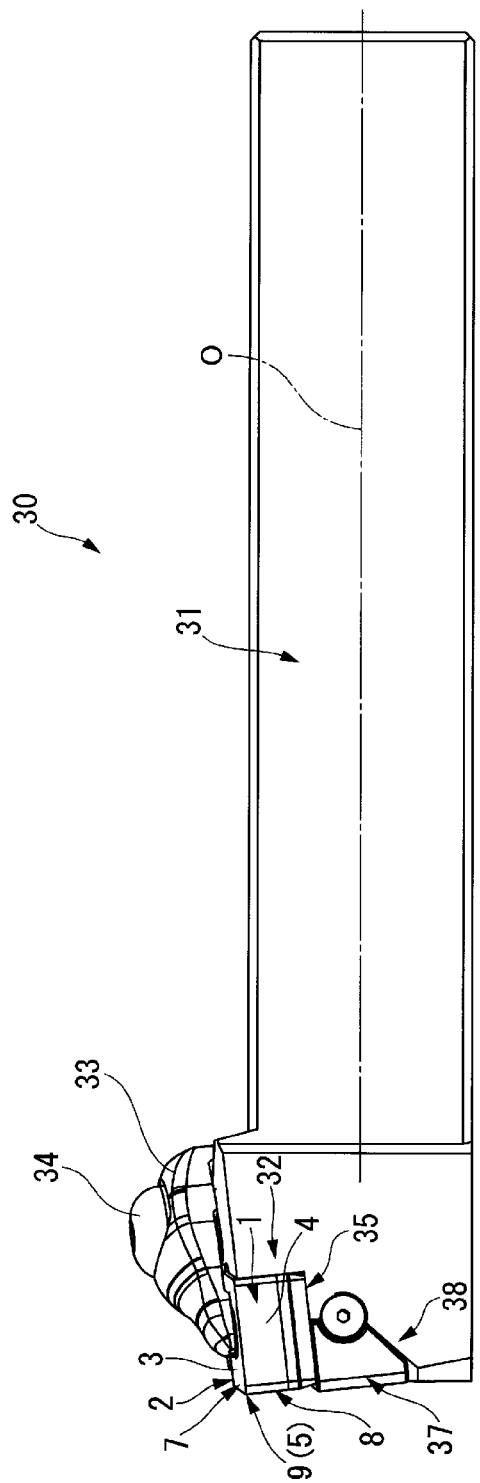

[FIG. 4]
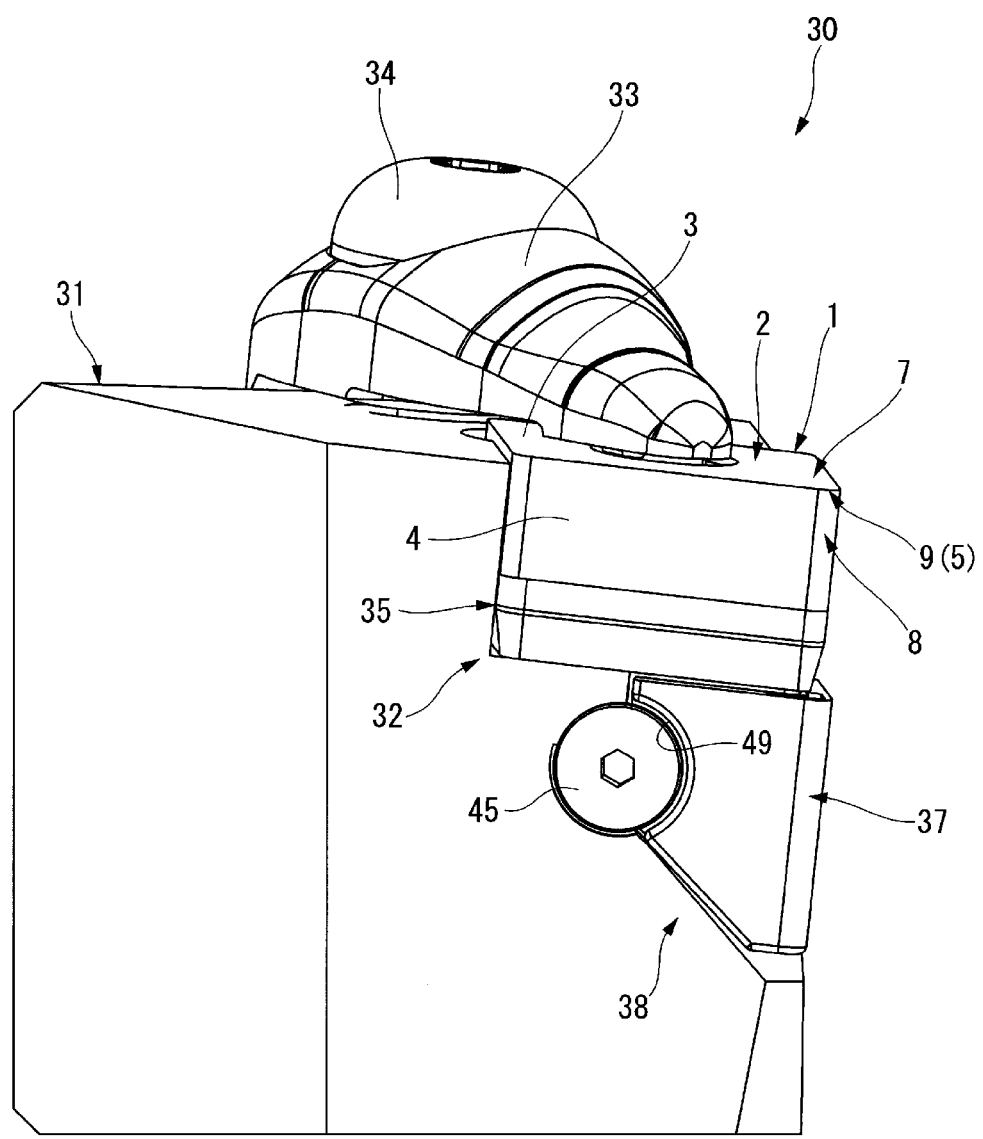

[FIG. 5]
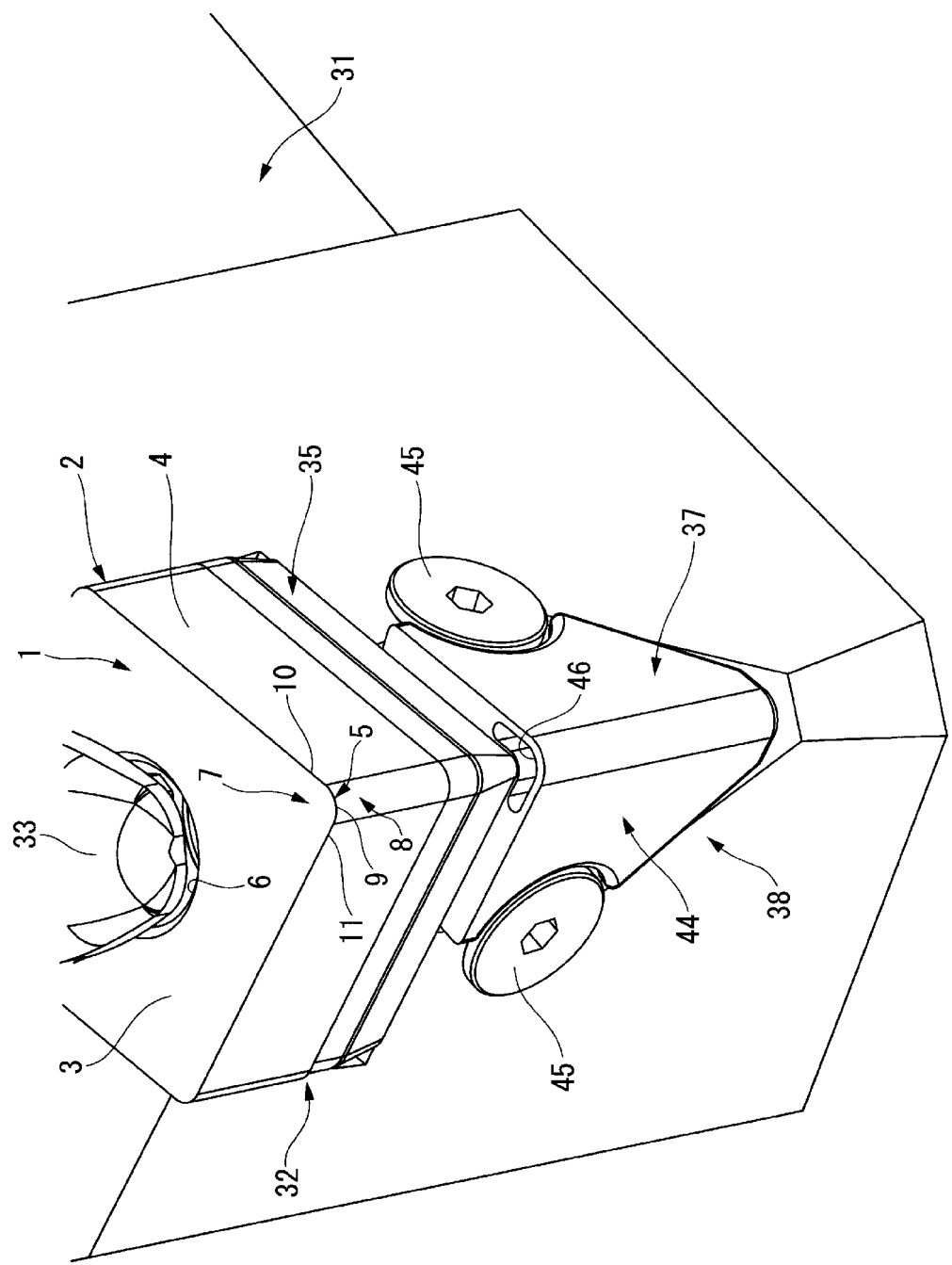

[FIG. 6]
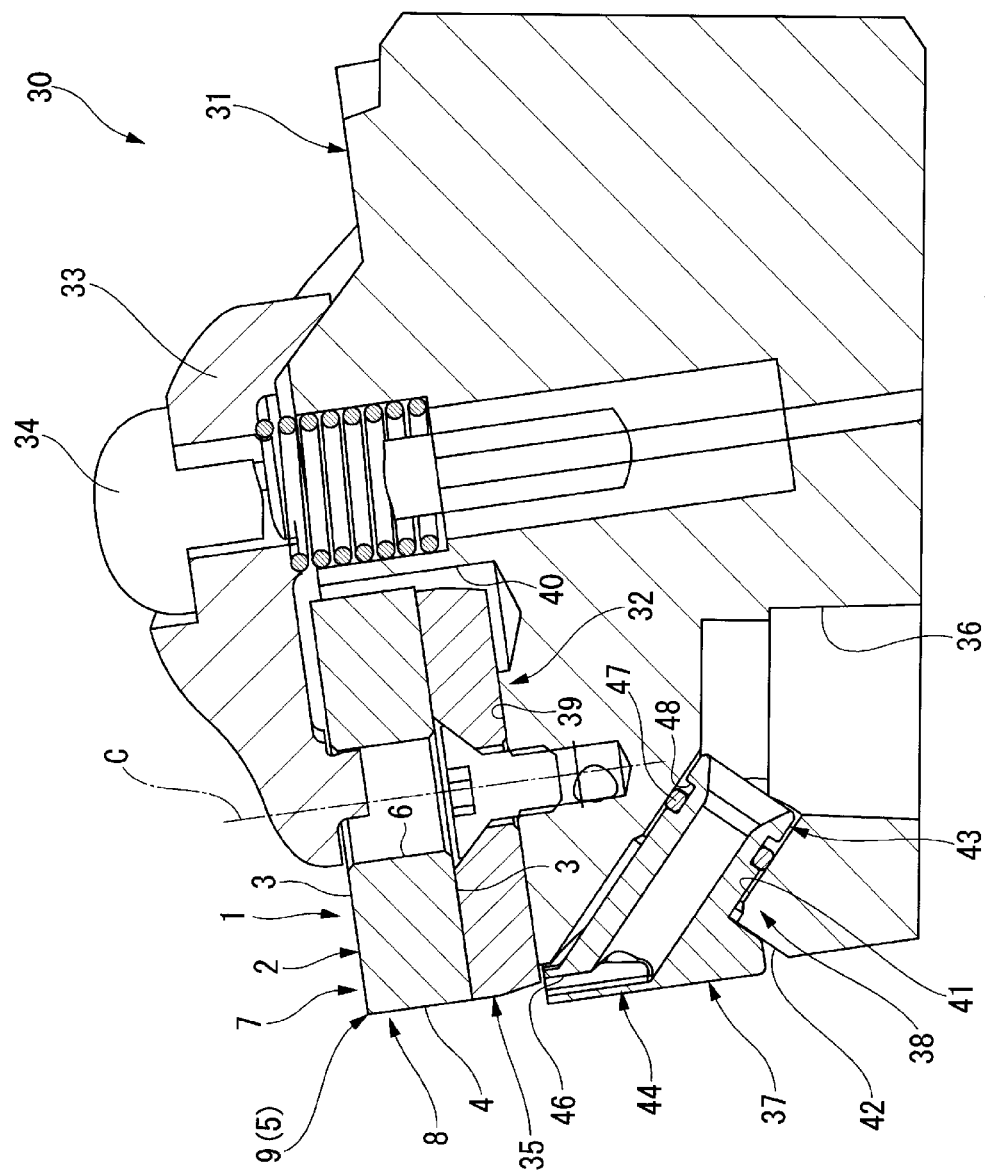

[FIG. 7]
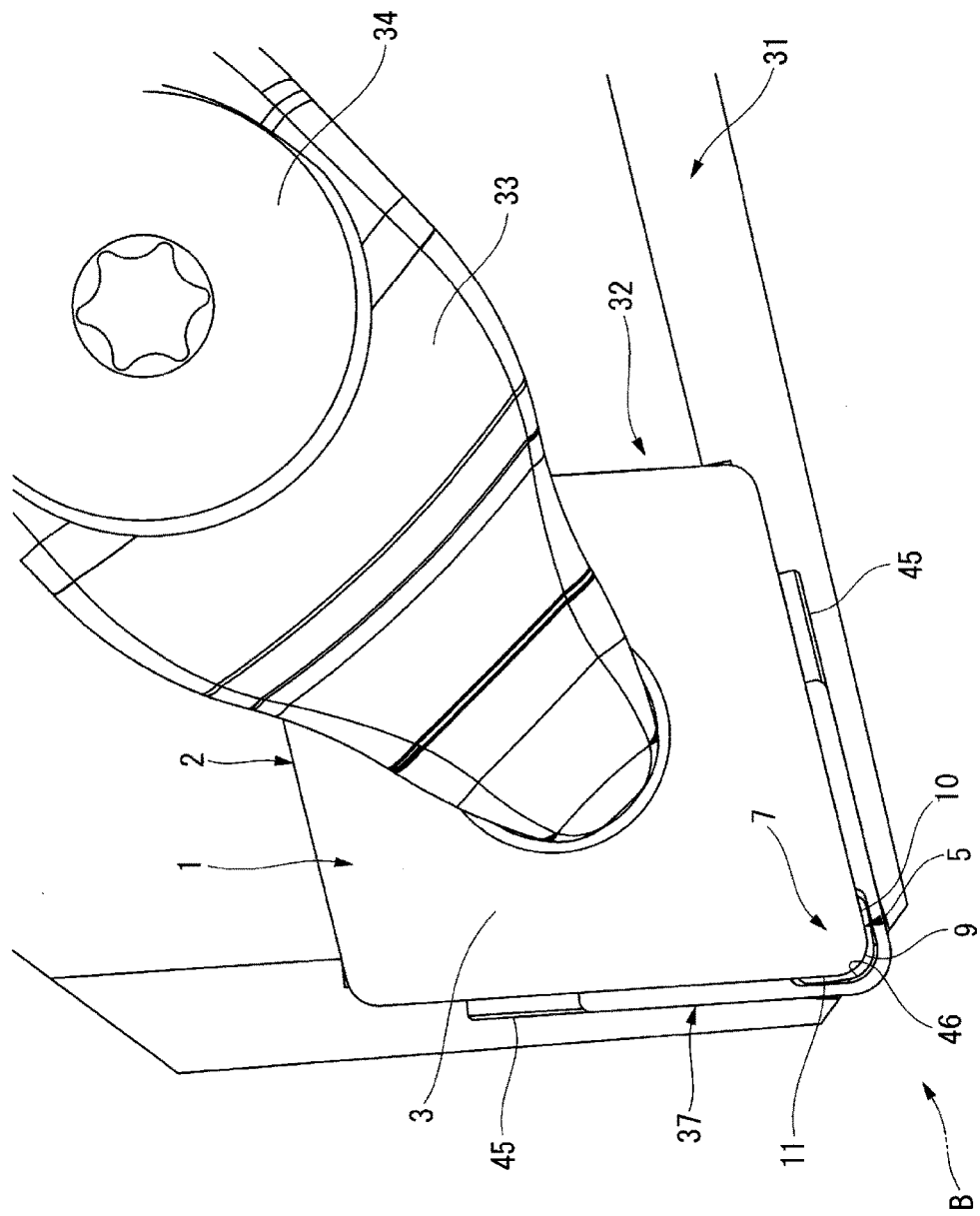

[FIG. 8]
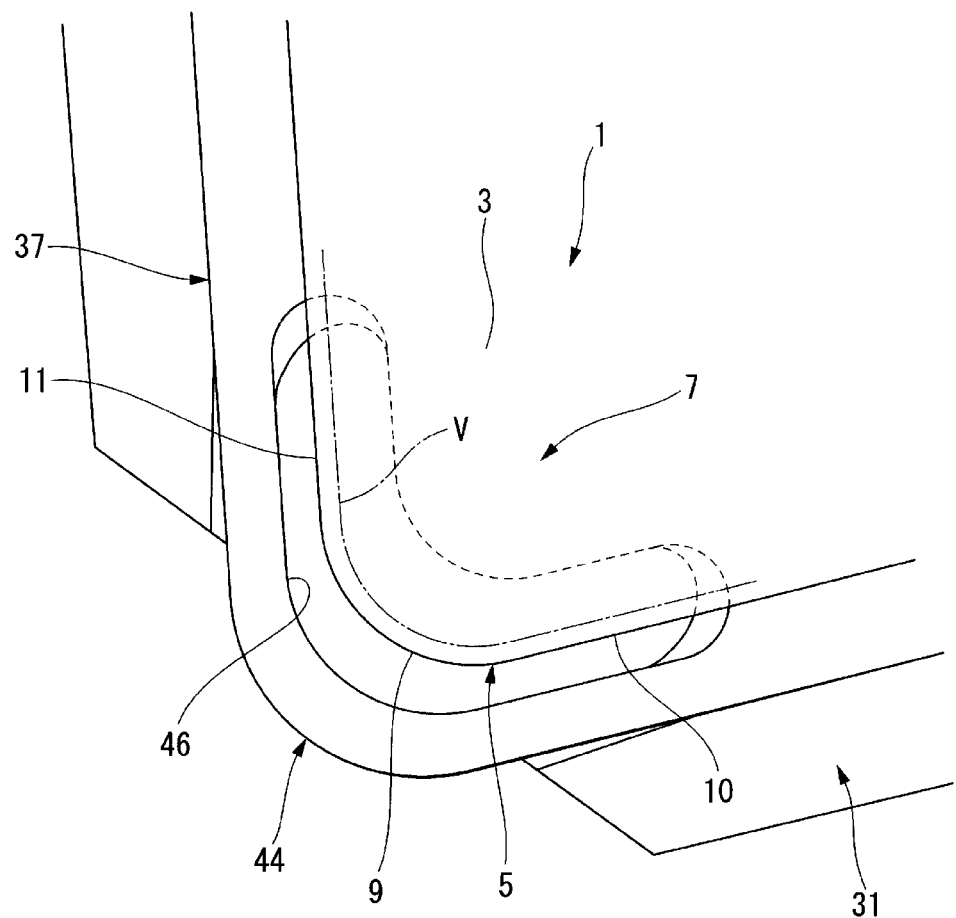

[FIG. 9]
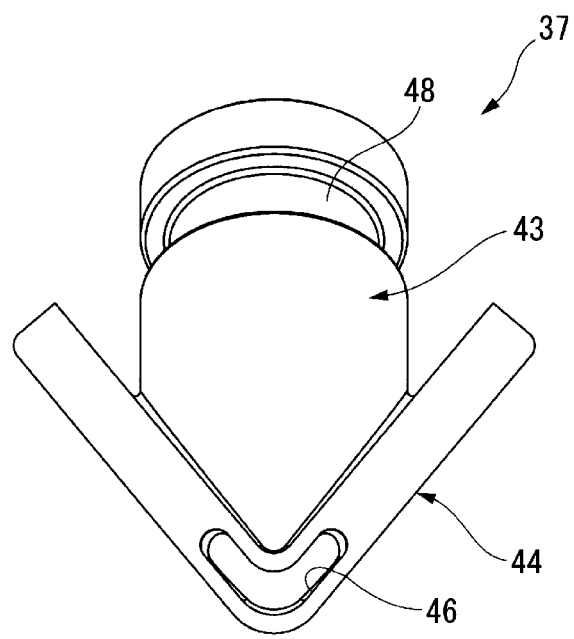

[FIG. 10]
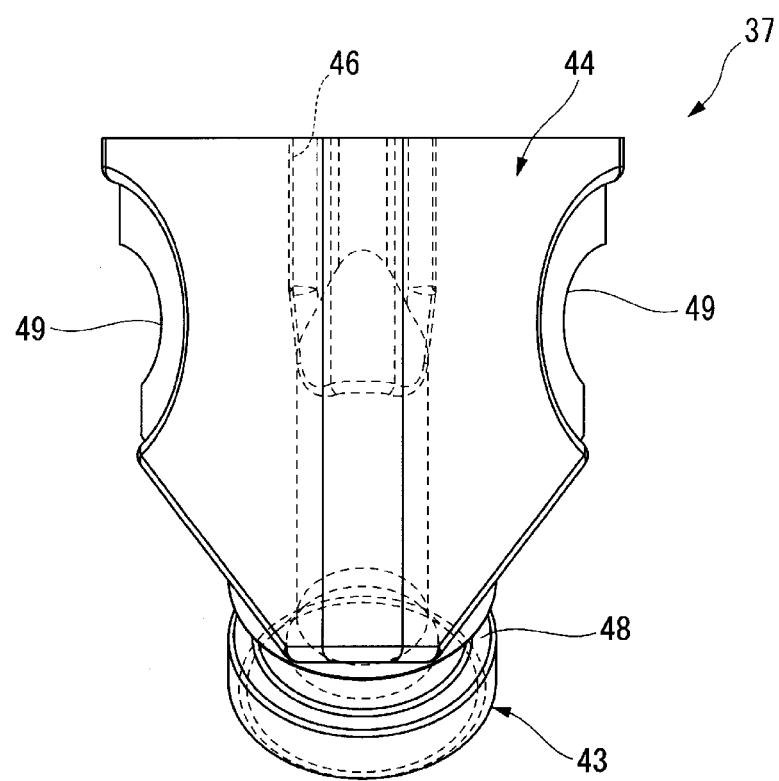

[FIG. 11]
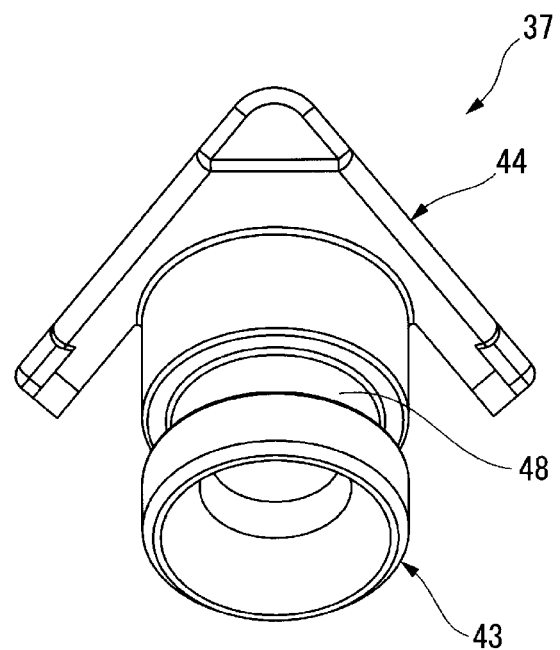

[FIG. 12]
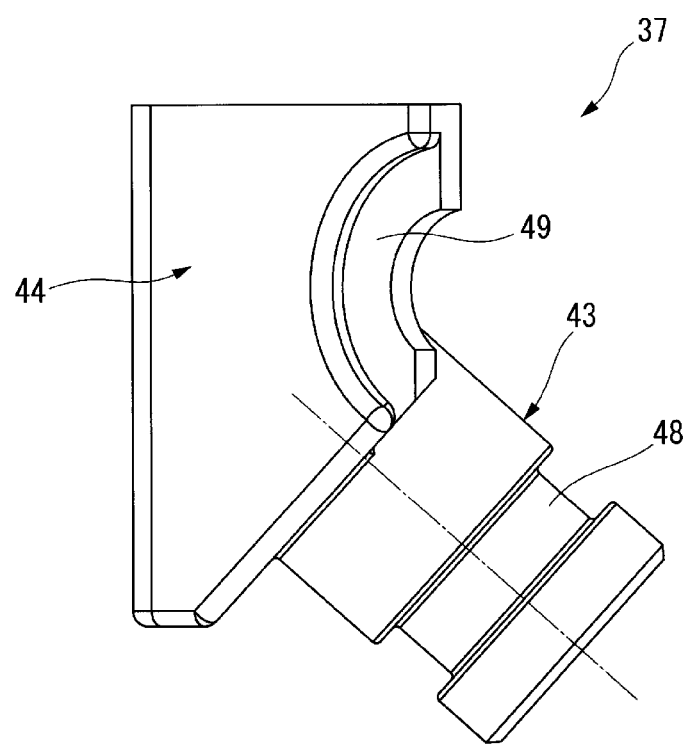

[FIG. 13]
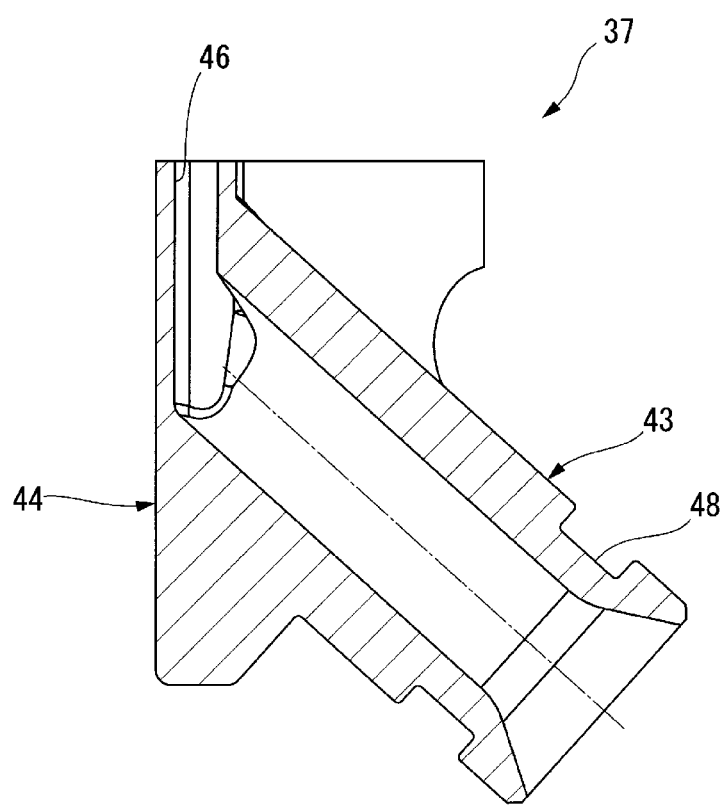

[FIG. 14]
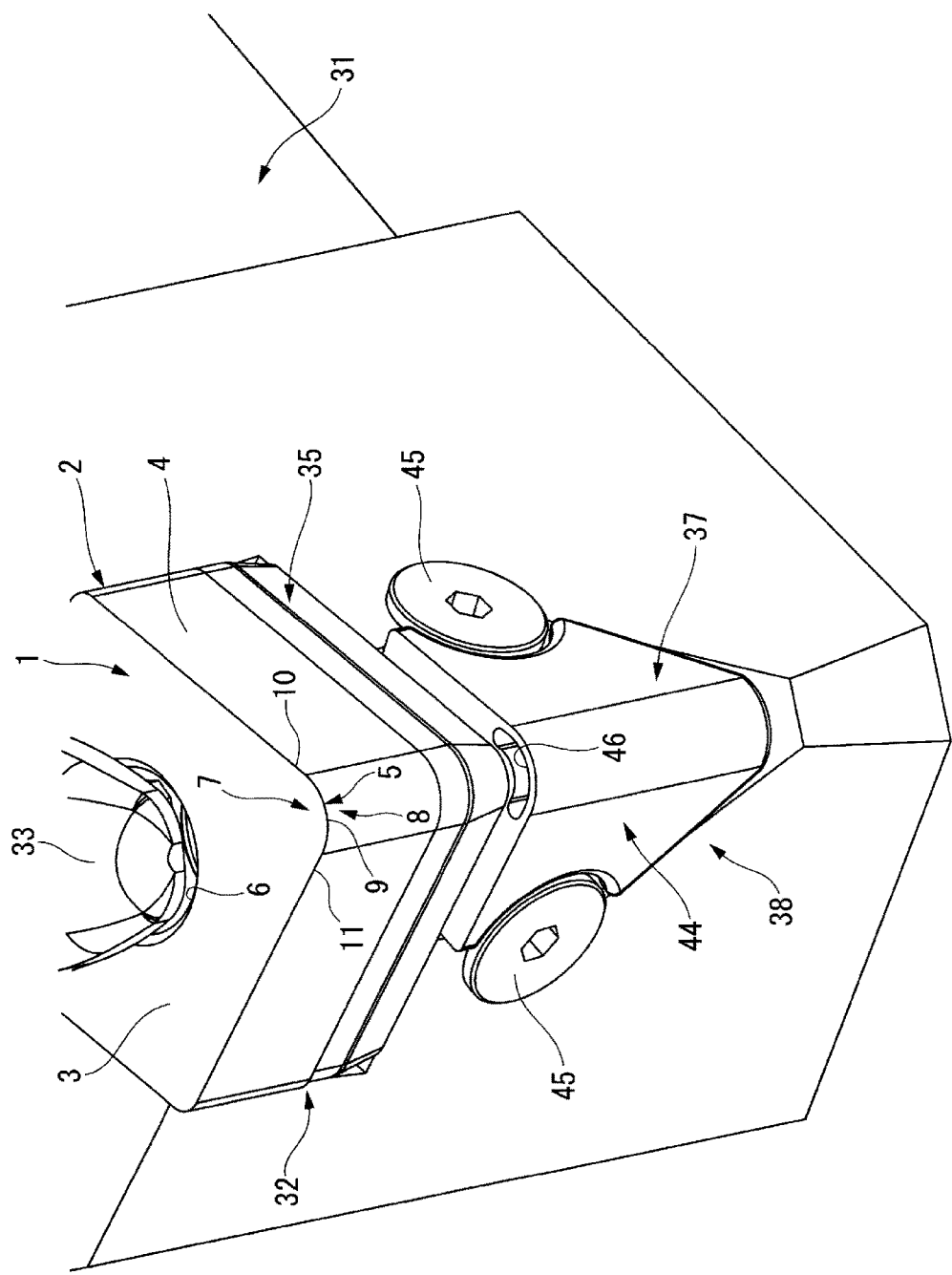

[FIG. 15]
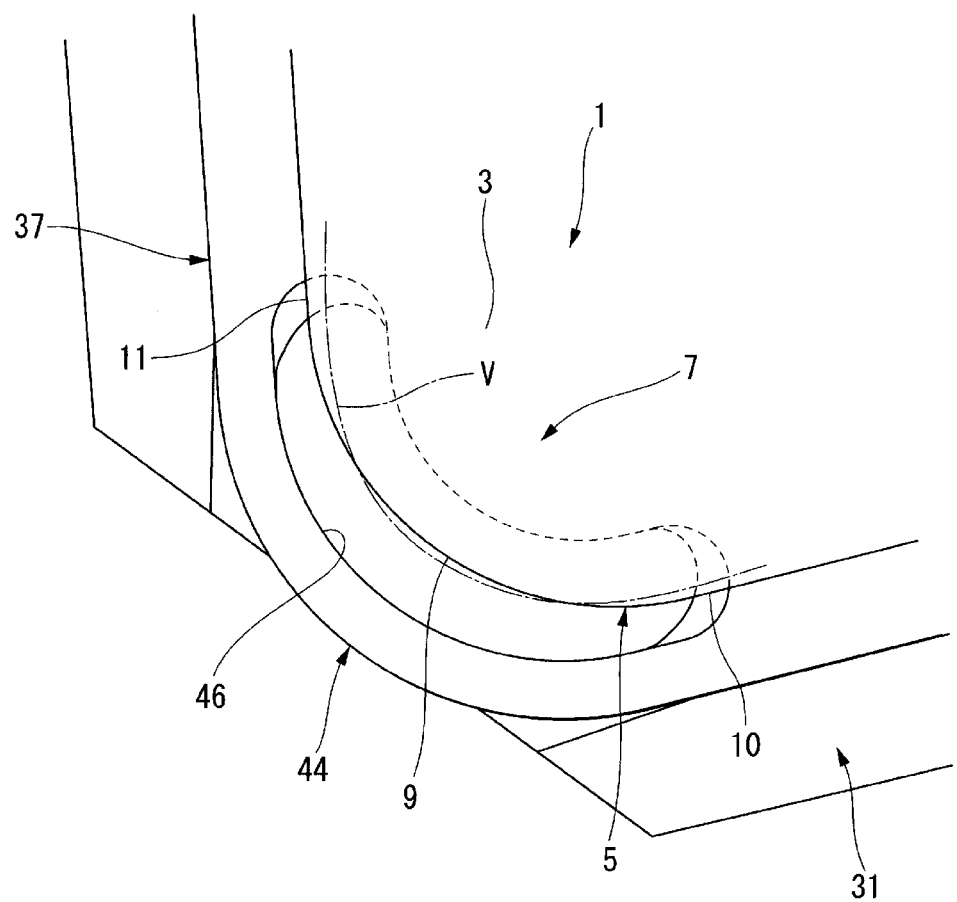

[FIG. 16]
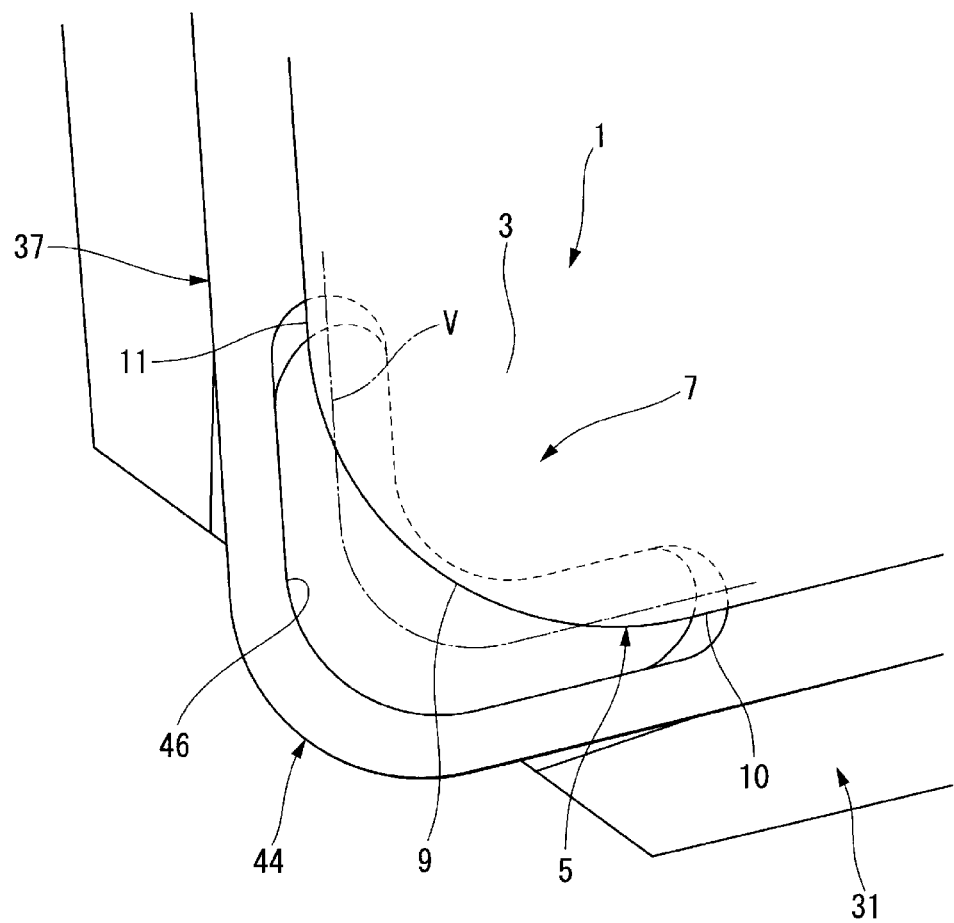

[FIG. 17]
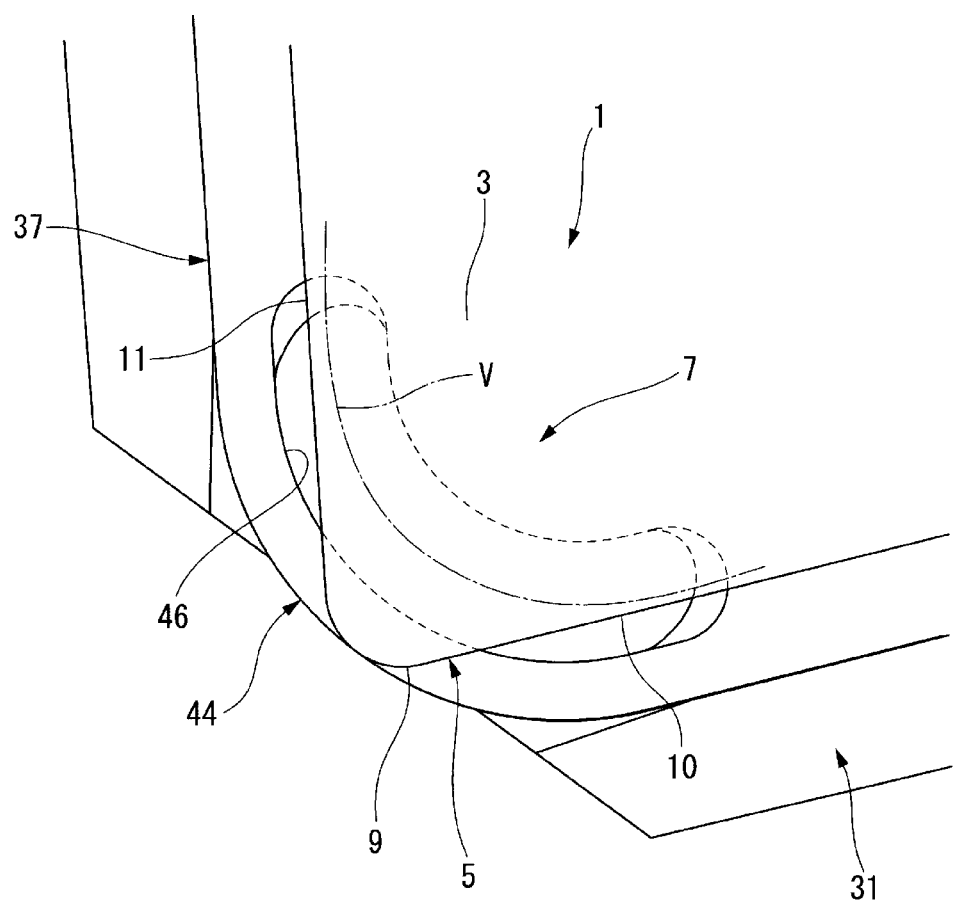

[FIG. 18]
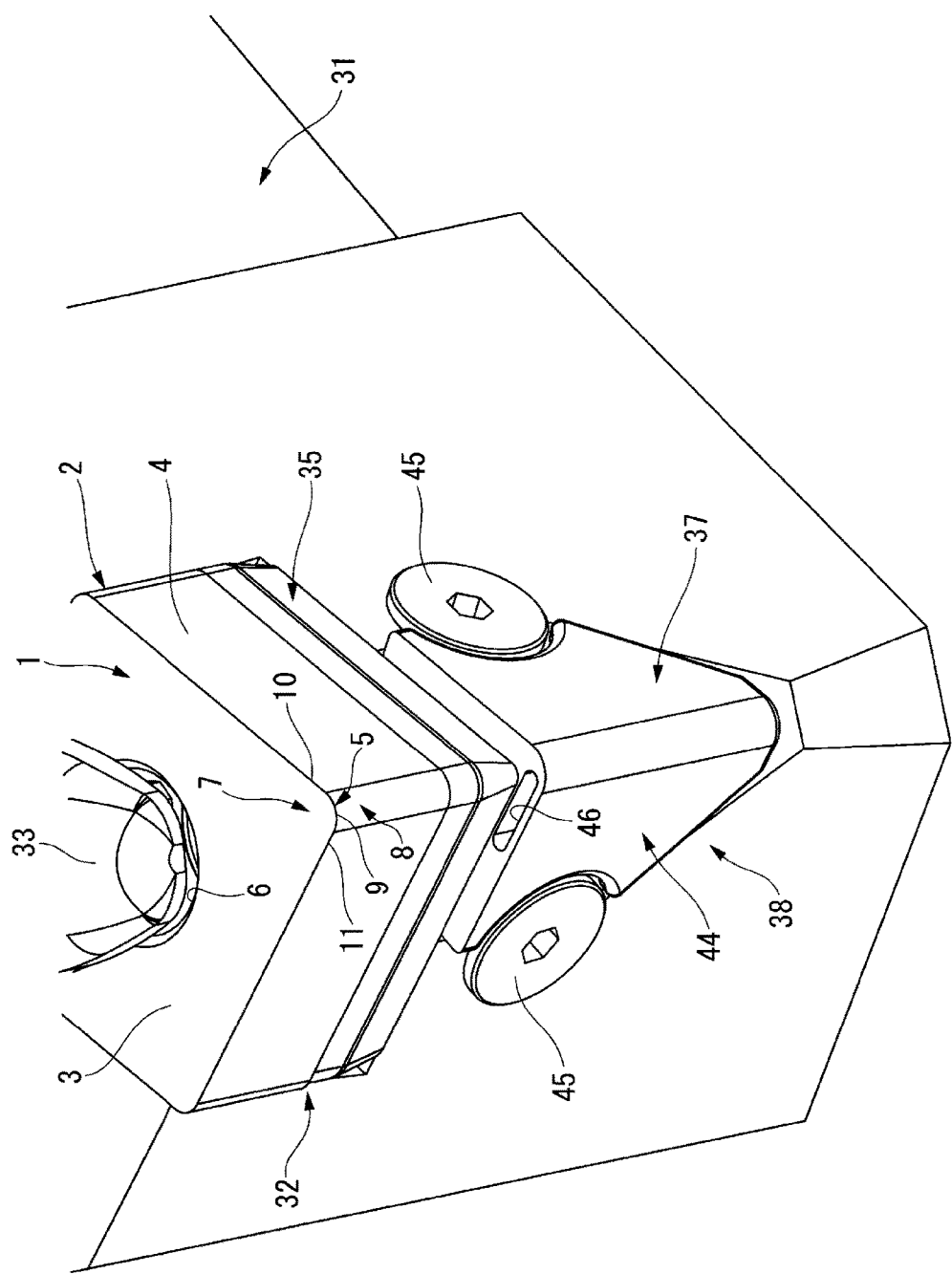

[FIG. 19]
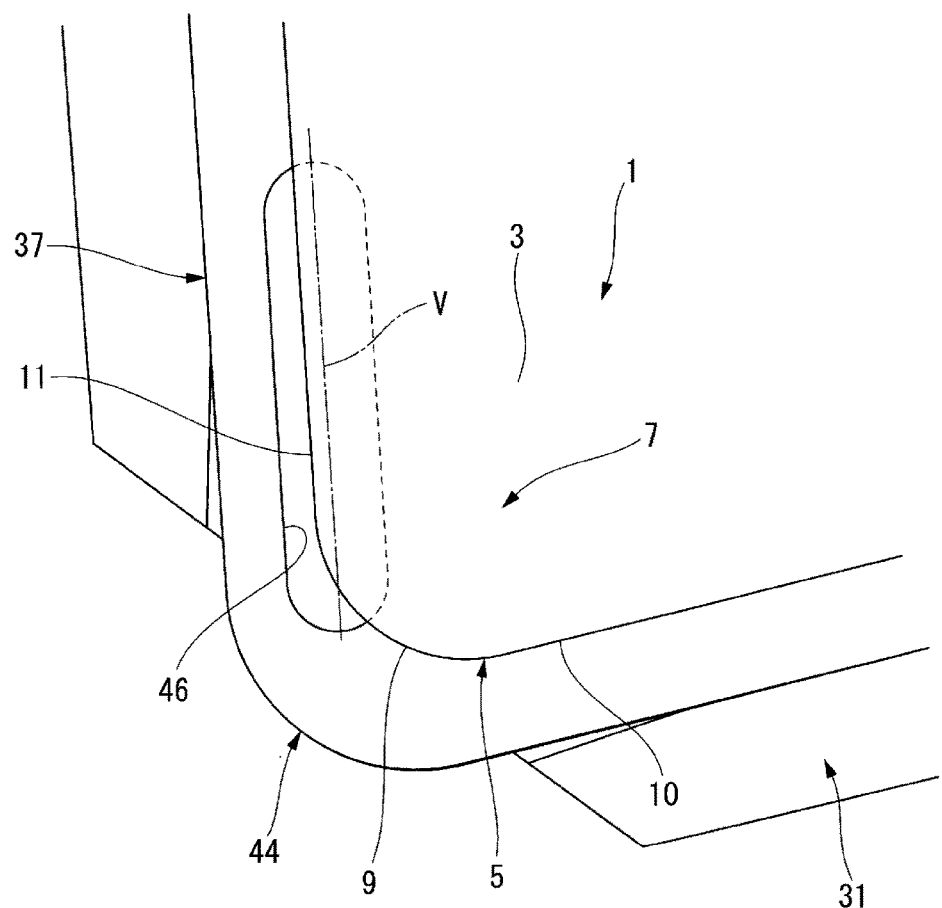

[FIG. 20]
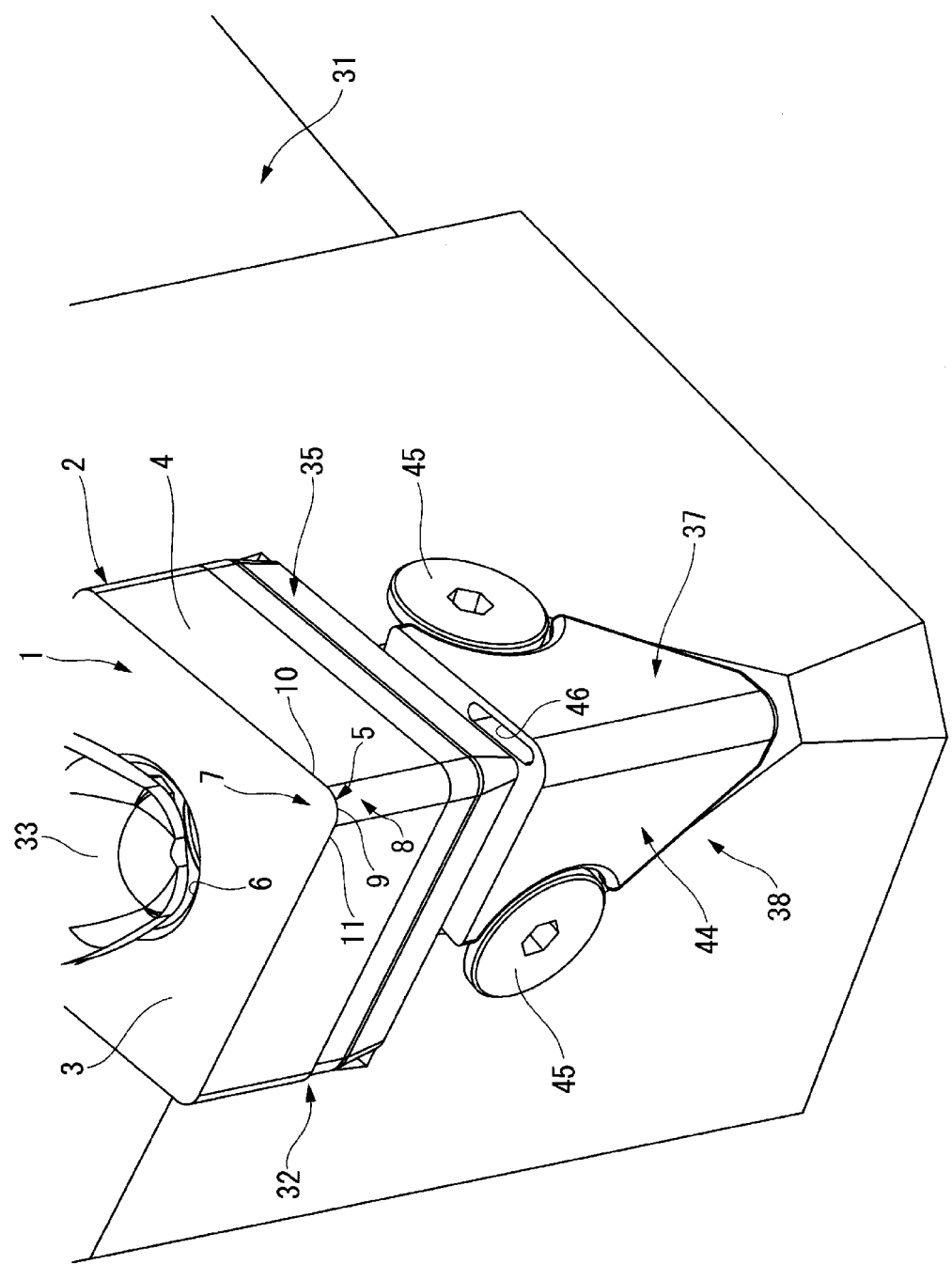

[FIG. 21]
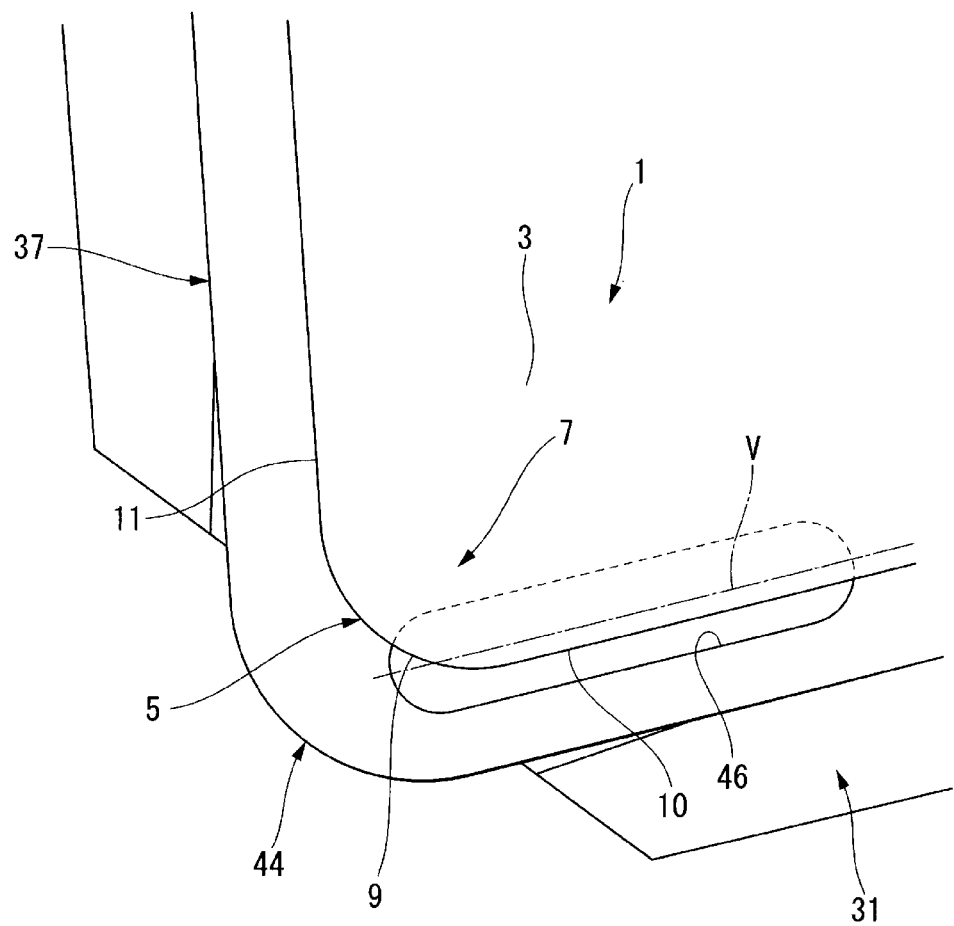

[FIG. 22]
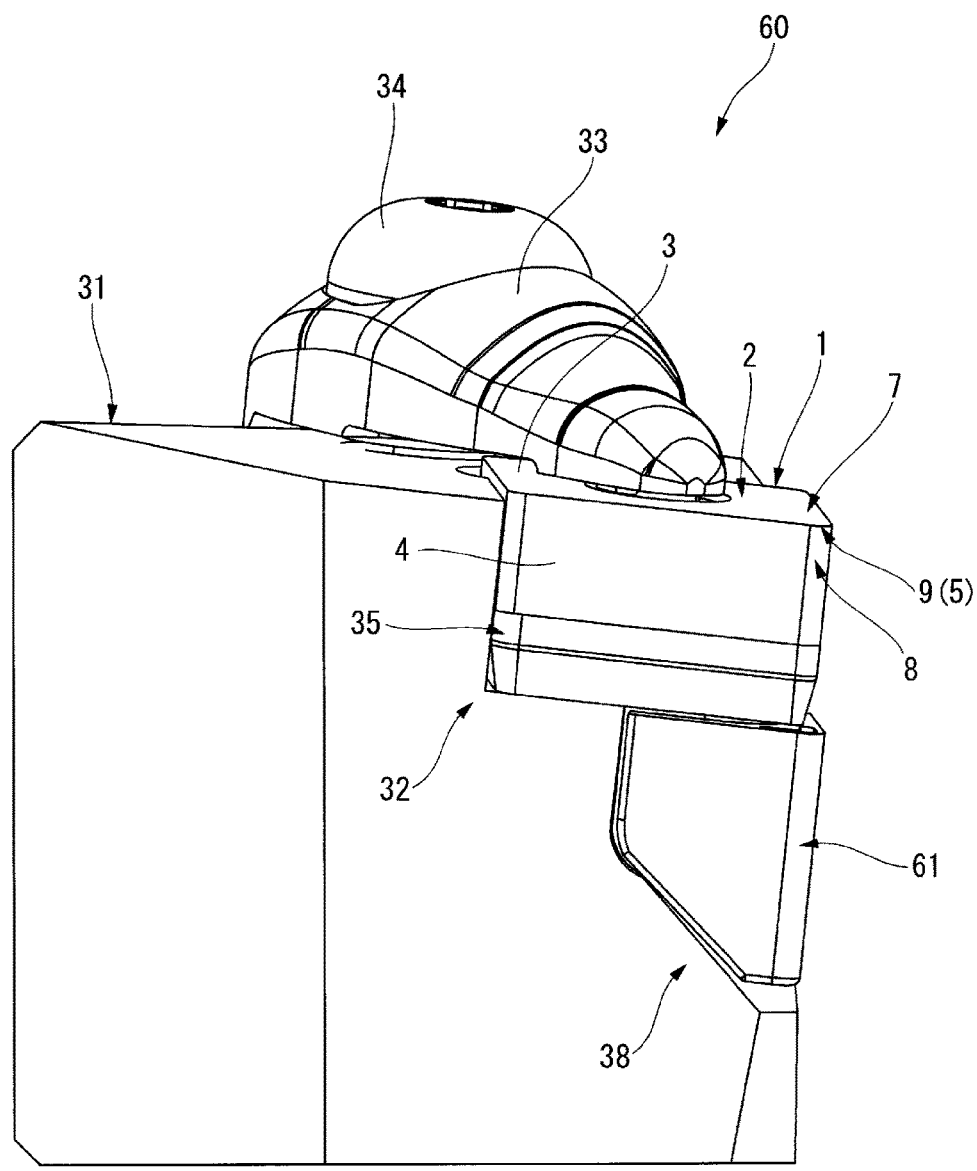

[FIG. 23]
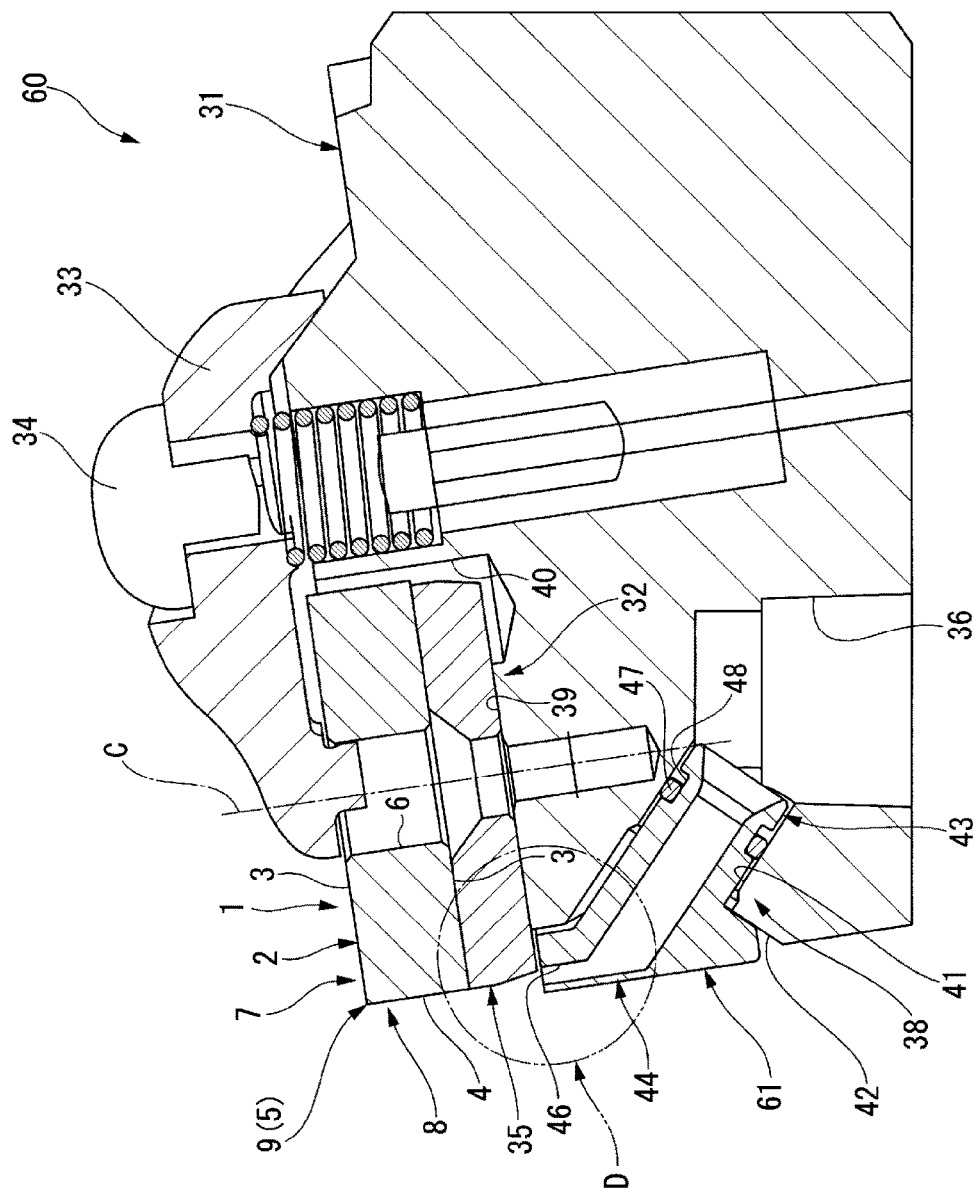

[FIG. 24]
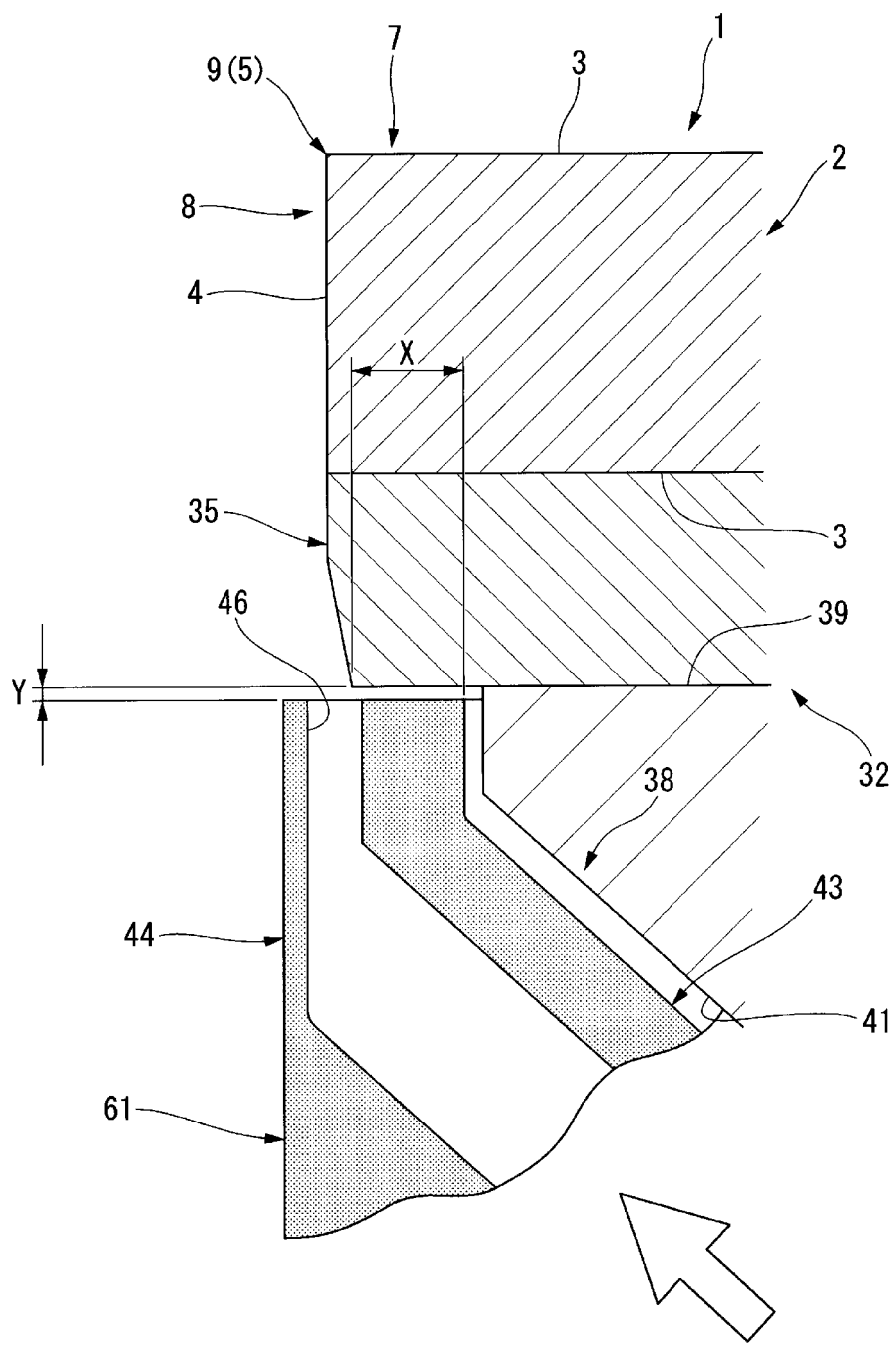

[FIG. 25]
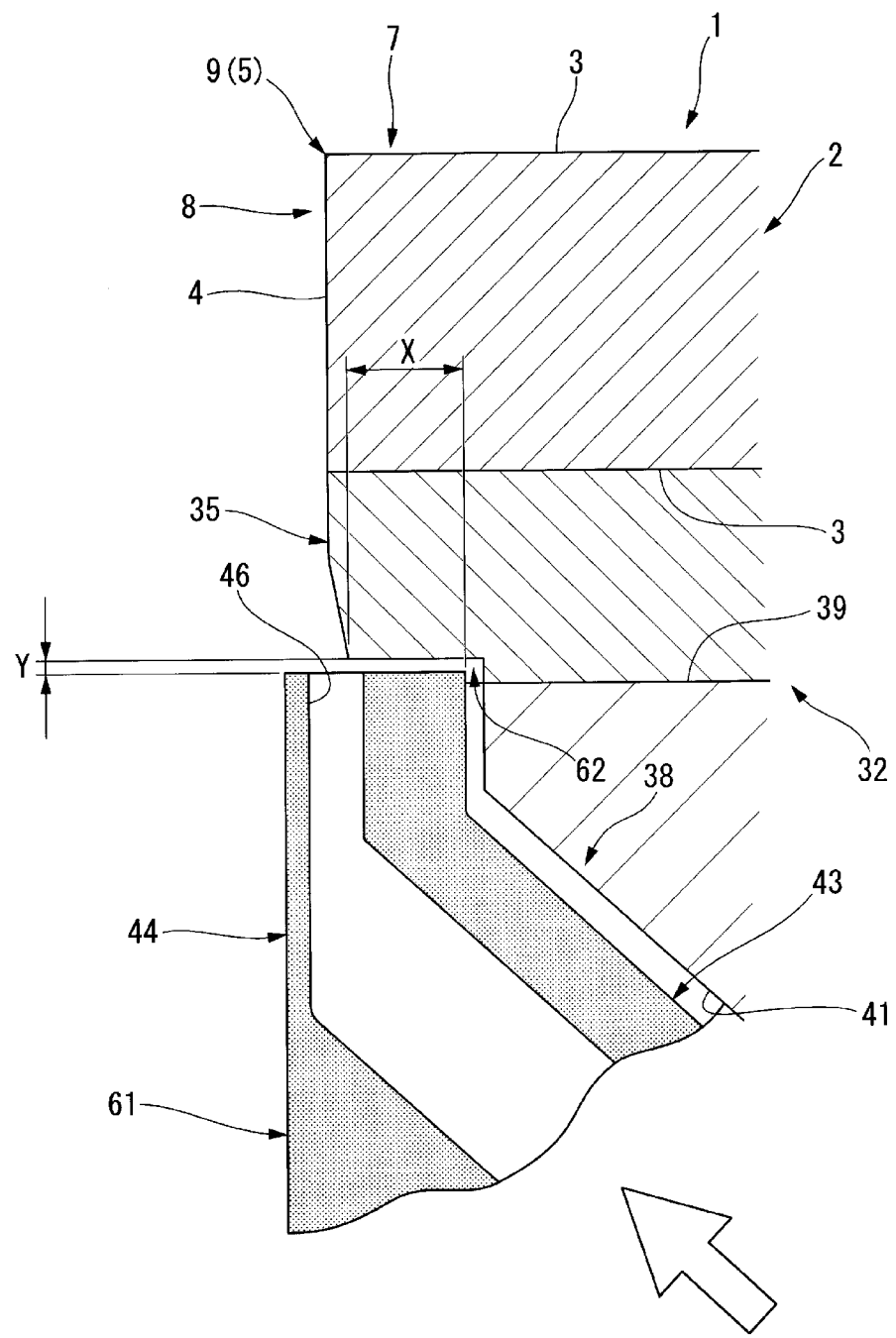

TOOL HOLDER

TECHNICAL FIELD

The present invention relates to a tool holder having a structure that supplies a coolant to a flank and a cutting edge.

BACKGROUND ART

A tool holder disclosed in, for example, PTL 1 is known as a tool holder in the related art. In the tool holder, a plate-like cutting insert is detachably disposed at the leading end portion of a shaft-shaped tool body, and the cutting insert includes a face, a flank, and a cutting edge that forms an intersection ridge between the face and the flank.

Further, an oil hole (coolant supply passage) in which a coolant (oil-based or water-soluble cutting fluid) flows is formed in the tool body, and a plate-like member including a recess is mounted on the leading end portion of the tool body. Furthermore, a coolant is ejected to the flank and the cutting edge from the oil hole through the recess of the plate-like member in a direction parallel to the flank of the cutting insert. This method of ejecting a coolant is referred to as a so-called jet coolant method, a JC method, and the like.

According to this structure, since it is difficult for a coolant to be affected by swarf in comparison with other structures that supply a coolant to the cutting edge from the face even though a coolant is supplied from outside or inside, the coolant easily reaches the cutting edge. For this reason, since the efficiency of the cooling of the cutting edge can be increased, the lengthening of the life of the insert and an increase in the efficiency of cutting can be expected.

CITATION LIST

Patent Literature

[PTL 1] JP-A-10-76404

SUMMARY OF INVENTION

Technical Problem

However, a coolant leaks in an unintended direction from a portion between the leading end portion of the tool body and the plate-like member in the tool holder in the related art. For this reason, a coolant cannot be efficiently supplied to the flank and the cutting edge. There is room for improvement in this regard.

Further, there is a case in which a predetermined cutting insert is selected from a plurality of kinds of indexable inserts having the shapes of cutting edges, such as the sizes of corner R, which are different from each other, and is mounted on the tool body to perform turning. In this case, it is difficult to accurately and stably supply a coolant to the flanks and the cutting edges of the respective indexable inserts of which the shapes of the cutting edges are set to various shapes.

Furthermore, highly accurate and stable supply of a coolant to predetermined portions of the flank and the cutting edge is also required according to the types of cutting.

The invention has been made in consideration of the above-mentioned circumstances, and an object of the invention is to provide a tool holder that can efficiently supply a coolant to a flank and a cutting edge by preventing the leakage of a coolant and can accurately and stably supply a coolant so as to correspond to the shapes of various cutting edges or the types of cutting.

Solution to Problem

The invention proposes the following means to solve the problem and to achieve the object.

That is, the invention provides a tool holder in which a face, a flank, and a cutting edge forming an intersection ridge between the face and the flank are disposed at a leading end portion of a shaft-shaped tool body. A coolant supply passage is formed in the tool body, and a coolant ejection member is detachably provided at the leading end portion of the tool body. The coolant ejection member includes a tubular portion and an ejection hole that communicates with the coolant supply passage through the inside of the tubular portion and opens toward the flank and the cutting edge.

According to the tool holder of the invention, the coolant ejection member is disposed at the leading end portion of the tool body, and a coolant, which flows in the coolant supply passage, is ejected to the flank and the cutting edge through the tubular portion and the ejection hole of the coolant ejection member.

Since the ejection hole of the coolant ejection member and the coolant supply passage communicate with each other through the tubular portion, the leakage of a coolant in an unintended direction from a portion other than the ejection hole is prevented.

In detail, since the tubular portion of the coolant ejection member surrounds a coolant flowing therein by the peripheral wall of the tubular portion, the leakage of a coolant to the outside from the peripheral wall is prevented. Further, the ejection hole of the coolant ejection member is, for example, a "hole", such as an L-shaped hole, an elongated hole (an I-shaped hole), a circular arc-shaped hole, a circular hole, or a polygonal hole, unlike the notch, such as a recess, of the plate-like member in the related art; and includes the annular peripheral edge of an opening even in any case. Since the annular peripheral edge of an opening is formed, the leakage of a coolant from a portion other than the ejection hole is prevented.

That is, since an area of the coolant ejection member between a portion, which is connected to the coolant supply passage, of the coolant ejection member and the ejection hole forms a hermetically sealed flow passage (chamber), the coolant ejection member can effectively prevent the unintended leakage of a coolant.

Therefore, according to the invention, a sufficient amount of a coolant can be efficiently supplied to the flank and the cutting edge without an increase in the amount of a coolant to be supplied.

Further, since the coolant ejection member is detachably provided at the leading end portion of the tool body, the following significant functional effects are obtained.

That is, in a case in which the cutting insert including the cutting edge is detachably mounted on, for example, the leading end portion of the tool body (the case of the tool holder), and the like, a plurality of kinds of coolant ejection members including ejection holes having shapes, disposition, sizes, and the like different from each other can be prepared so as to correspond to the shapes of various cutting edges of a plurality of kinds of indexable inserts or the types of cutting (hereinafter, omitted together with the shape of the cutting edge and the like). Furthermore, a predetermined coolant ejection member suitable for the shape of a predetermined cutting edge can be selected from these coolant ejection members and can be mounted on the tool body.

That is, a coolant ejection member having the shape of the ejection hole optimum for the shapes and the like of various cutting edges can be used.

Accordingly, a coolant can be accurately and stably supplied to the flank and the cutting edge regardless of the shape and the like of the cutting edge. Therefore, cooling efficiency near the cutting edge can be improved. Accordingly, effects, such as the improvement of cutting accuracy, an increase in the efficiency of cutting, and the extension (lengthening) of the life of a tool, can be expected.

Further, in the tool holder of the invention, it is preferable that the flank is positioned between the ejection hole of the coolant ejection member and the cutting edge and the ejection hole is disposed adjacent to the flank.

In this case, since the ejection hole of the coolant ejection member is disposed adjacent (close) to the flank at the leading end portion of the tool body, a distance between the ejection hole and the flank and a distance between the ejection hole and the cutting edge can be reduced.

Accordingly, the above-mentioned effect of accurately supplying a coolant to the flank and the cutting edge is more significant.

Furthermore, in the tool holder of the invention, it is preferable that the tubular portion extends so as to be gradually inclined toward the cutting edge from the ejection hole as approaching at least one of a leading end side and a lateral side of the tool body from a portion, which is connected to the coolant supply passage, of the tubular portion.

In this case, the tubular portion extends so as to be inclined, the tubular portion and the coolant supply passage are connected to each other at a gentle angle so as to intersect each other at an obtuse angle. Accordingly, the pressure loss of a coolant flowing in the tubular portion, the coolant supply passage, and the ejection hole can be reduced. Therefore, since it is possible to prevent coolant supply pressure from being reduced in the tool holder, it is possible to further improve the efficiency of the supply of a coolant to the flank and the cutting edge.

Further, in the tool holder of the invention, it is preferable that an annular seal member is fitted to an outer periphery of the tubular portion.

In this case, since the annular seal member, such as an O-ring, is fitted to the outer periphery of the tubular portion, it is possible to prevent a coolant from flowing on the outer periphery of the tubular portion and to prevent the coolant from leaking to the outside. Therefore, it is easy to more significantly obtain the above-mentioned functional effects of the invention.

Furthermore, since the contact resistance between the tubular portion and the hole portion or the like of the tool body in which the tubular portion is disposed is increased by the seal member, the easy separation of the coolant ejection member from the tool body, which is caused by coolant supply pressure or the like, is suppressed. That is, an action for retaining the coolant ejection member can be obtained by the seal member.

Moreover, in the tool holder of the invention, it is preferable that a housing recess, which communicates with the coolant supply passage, is formed at the leading end portion of the tool body and the coolant ejection member is housed in the housing recess.

In this case, since the coolant ejection member is housed in the housing recess, the significant projection (protrusion) of the tool body from the leading end portion is suppressed.

Accordingly, while the above-mentioned significant functional effects are obtained by the coolant ejection member, the tool holder can be made compact and a situation in which the conditions of turning are limited since the coolant ejection member is mounted can also be prevented.

Advantageous Effects of Invention

According to the tool holder of the invention, it is possible to efficiently supply a coolant to a flank and a cutting edge by preventing the leakage of a coolant and to accurately and stably supply a coolant so as to correspond to the shapes of various cutting edges or the types of cutting.

BRIEF DESCRIPTION OF DRAWINGS

FIG. 1 is a perspective view of a tool holder according to a first embodiment of the invention.
FIG. 2 is a top view of the tool holder of FIG. 1.
FIG. 3 is a side view of the tool holder of FIG. 1.
FIG. 4 is a front view of the tool holder of FIG. 1.
FIG. 5 is an enlarged perspective view of a main portion of the tool holder of FIG. 1.
FIG. 6 is a view showing the cross-section taken along line A-A of FIG. 2.
FIG. 7 is a top view illustrating the shape of a cutting edge and the shape of an ejection hole corresponding to the shape of the cutting edge.
FIG. 8 is an enlarged view of a portion B of FIG. 7.
FIG. 9 is a top view showing a coolant ejection member.
FIG. 10 is a front view of the coolant ejection member.
FIG. 11 is a bottom view of the coolant ejection member.
FIG. 12 is a side view of the coolant ejection member.
FIG. 13 is a longitudinal sectional view of the coolant ejection member.
FIG. 14 is an enlarged perspective view of a main portion of the tool holder and shows a modification example of the coolant ejection member.
FIG. 15 is an enlarged top view of the main portion of the coolant ejection member of FIG. 14.
FIG. 16 is a top view illustrating a combination of the shape of a cutting edge and the shape of an ejection hole.
FIG. 17 is a top view illustrating a combination of the shape of a cutting edge and the shape of an ejection hole.
FIG. 18 is an enlarged perspective view of a main portion of the tool holder and shows a modification example of the coolant ejection member.
FIG. 19 is an enlarged top view of the main portion of the coolant ejection member of FIG. 18.
FIG. 20 is an enlarged perspective view of a main portion of the tool holder and shows a modification example of the coolant ejection member.
FIG. 21 is an enlarged top view of the main portion of the coolant ejection member of FIG. 20.
FIG. 22 is a front view of a tool holder according to a second embodiment of the invention.
FIG. 23 is a longitudinal sectional view of a main portion of the tool holder of FIG. 22.
FIG. 24 is an enlarged view of a portion D of FIG.
FIG. 25 is a longitudinal sectional view showing a modification example of a main portion of a coolant ejection member.

DESCRIPTION OF EMBODIMENTS

First Embodiment

A tool holder 30, which is a tool holder according to a first embodiment of the invention, will be described below with reference to the drawings.

The tool holder 30 of this embodiment is to perform turning (cutting) on a work material that is made of a metal material or the like.

[Schematic Structure of Tool Holder]

As illustrated in FIGS. 1 to 6, the tool holder 30 includes a cutting insert 1 that is made of a hard material, such as cemented carbide, and a tool body 31 which is made of a steel material or the like and on which the cutting insert 1 is detachably mounted.

The tool body 31 has the shape of a shaft, and the cutting insert 1 has the shape of a plate and is disposed at the leading end portion of the tool body 31. Further, a face 7, a flank 8, and a cutting edge 5 that forms an intersection ridge between the face 7 and the flank 8 are formed on the cutting insert 1.

Although not particularly shown, a work material, which is to be subjected to turning by the tool holder 30 of this embodiment, has the shape of, for example, a disc, a column, a shaft, or the like. Further, while the work material is rotated about the central axis thereof in the rotation direction of the work material, the tool holder 30 performs machining on the peripheral surface (the outer peripheral surface or the inner peripheral surface) of the work material or performs machining on the end face of the work material, which is directed to the direction of the central axis of the work material, by the cutting edge 5 of the cutting insert 1 protruding from the leading end of the tool body 31.

[Tool Body]

The cross-section of the tool body 31 of this embodiment perpendicular to an axis O of the tool body 31 has a rectangular shape, and the tool body 31 of this embodiment is formed in the shape of a square bar. The leading end portion of both end portions of the tool body 31 in the direction of the axis O is disposed close to the surface, which is to be machined, of the work material, during machining and the base end portion thereof is detachably mounted on a machine tool (not shown).

The tool body 31 includes a recessed insert mounting portion 32 which is formed at the leading end portion of the tool body 31 and on which the cutting insert 1 is to be mounted, a clamp mechanism that includes a clamp bridge 33 and a clamp screw 34 used to detachably clamp (fix) the cutting insert 1 on the insert mounting portion 32, a coolant supply passage 36 (see FIG. 6) that is formed in the tool body 31, a coolant ejection member 37 that is detachably provided at the leading end portion of the tool body 31, and a housing recess 38 that is formed at the leading end portion of the tool body 31 so as to communicate with the coolant supply passage 36 and can house the coolant ejection member 37.

[Definition of Direction Used in this Specification]

Here, in this specification, in the direction of the axis O of the tool body 31 of the tool holder 30, a side, which is directed to the surface, which is to be machined, of the work material (a side directed to the end portion where the cutting insert 1 is to be disposed) is referred to as a leading end side and a side opposite to the surface, which is to be machined, of the work material is referred to as a base end side.

Further, in a direction parallel to a virtual plane perpendicular to the axis O of the tool body 31, a side to which the face 7 of the cutting insert 1 is directed is referred to as an upper side, a side opposite to the face 7 is referred to as a lower side, and a side orthogonal to the upper side and the lower side (a vertical direction) is referred to as a lateral side.

However, although not particularly shown, the tool body 31 of the tool holder 30 is mounted on the machine tool during turning so that the face 7 of the cutting insert 1 disposed on the insert mounting portion 32 is directed to the lower side in the vertical direction.

Further, in FIG. 6, a direction in which an insert axis C of the cutting insert 1 extends is referred to as the direction of the insert axis C, a direction orthogonal to the insert axis C is referred to as the radial direction of the insert, and a direction around the insert axis C is referred to as the circumferential direction of the insert.

In this embodiment, the insert axis C extends so as to be inclined with respect to the vertical direction of the tool body 31 (the vertical direction in FIG. 6).

[Insert Mounting Portion]

The insert mounting portion 32 has the shape of a recess that is formed so as to be notched corresponding to the shape of the cutting insert 1. In this embodiment, the cutting insert 1 is formed in the shape of a substantially rhombic and rectangular plate and the insert mounting portion 32 has the shape of a substantially rhombic and rectangular hole that opens toward the leading end side in the direction of the axis O, the upper side, and the lateral side at the leading end portion of the tool body 31.

In FIG. 6, the insert mounting portion 32 includes a bottom wall 39 that is disposed substantially in parallel to a seating surface of the cutting insert 1 (the back of a surface and a back 3 of the cutting insert 1) to be mounted on the insert mounting portion 32, a shim 35 that is detachably disposed on the bottom wall 39 and is interposed between the bottom wall 39 and the cutting insert 1, and a pair of side walls (not shown in FIG. 6) that is in contact with an outer peripheral surface 4 of the cutting insert 1.

The bottom wall 39 of the insert mounting portion 32 has the shape of a substantially rhombic and rectangular surface, and the shim 35 has the shape of a substantially rhombic and rectangular plate. The surface, which is opposite to the bottom wall 39, of the surface and the back of the shim 35 forms a mounting surface on which the seating surface of the cutting insert 1 is to be seated.

In a shown example, the shim 35 is fixed to the bottom wall 39 by a countersunk head screw. Further, the lower portion of the outer peripheral surface of the shim 35 is gradually inclined inward in the radial direction of the insert toward the lower side. The shim 35 is made of, for example, a hard material, such as cemented carbide.

Each of the pair of side walls of the insert mounting portion 32 has the shape of a substantially rectangular surface. The pair of side walls intersects each other so as to form an acute angle, which corresponds to concavity, therebetween, intersects the bottom wall 39 so as to form a right angle, which corresponds to concavity, and stands up from the bottom wall 39.

In the example shown in FIG. 6, a groove-shaped undercut portion 40, which extends in the direction of the insert axis C, is formed at an intersecting portion between the pair of side walls so as to house corners, which have an acute angle, of the cutting insert 1 and the shim 35.

[Clamp Mechanism]

The clamp mechanism, which includes the clamp bridge 33 and the clamp screw 34, presses the cutting insert 1 against the shim 35 of the insert mounting portion 32 and pulls the cutting insert 1 toward the pair of side walls of the insert mounting portion 32 (to the inside of the tool body 31) to regulate the movement of the cutting insert 1 relative to the insert mounting portion 32 and to clamp (fix) the cutting insert 1.

[Coolant Supply Passage]

The coolant supply passage 36 is a flow passage for a coolant (oil-based or water-soluble cutting fluid) that is formed in the tool body 31. In the example shown in FIG. 6, the coolant supply passage 36 extends in the vertical direction and opens to the lower surface of the tool body 31. Further, an upper end portion of the coolant supply passage 36 is formed so as to have a diameter smaller than the diameter of a portion of the coolant supply passage 36 other than the upper end portion.

Coolant supply means (not shown), which is provided outside the tool holder 30, is connected to the coolant supply passage 36.

[Housing Recess]

The housing recess 38 has the shape of a recess that is formed so as to be notched corresponding to the shape of the coolant ejection member 37. The housing recess 38 includes a hole portion 41 that is connected to the coolant supply passage 36 and a notched portion 42 that is connected to the side of the hole portion 41 opposite to the coolant supply passage 36. The hole portion 41 is formed in a shape corresponding to a tubular portion 43 of the coolant ejection member 37 to be described below, and the notched portion 42 is formed in a shape corresponding to an ejection portion 44 of the coolant ejection member 37.

In the example of this embodiment, the hole portion 41 is a circular hole and the cross-section of the hole portion 41 perpendicular to the extending direction of the hole portion 41 has a circular shape. The hole portion 41 is connected to the upper end portion of the coolant supply passage 36, and extends so as to be gradually inclined toward the cutting edge 5 in the direction of the insert axis C (that is, toward the face 7 from the seating surface along the direction of the insert axis C) as approaching at least one of the leading end side and the lateral side of the tool body 31 (as approaching the leading end side and the lateral side in this embodiment) from a portion, which is connected to the coolant supply passage 36, of the hole portion 41.

In the example shown in FIG. 6, the diameter of a portion, which is connected to the notched portion 42, of the hole portion 41 is larger than the diameter of the portion thereof that is connected to the coolant supply passage 36.

The notched portion 42 has the shape of a notch that opens to the leading end side in the direction of the axis O, the lateral side, and the bottom wall 39 of the insert mounting portion 32 at the leading end portion of the tool body 31. Although not particularly shown, the shape of a portion, which opens to the bottom wall 39, of the notched portion 42 is formed in an L shape.

[Coolant Ejection Member]

In FIGS. 5 and 6, the coolant ejection member 37 is disposed at the leading end portion of the tool body 31 so as to be housed in the housing recess 38. In this embodiment, the coolant ejection member 37 is detachably fixed to the leading end portion of the tool body 31 by mounting screws 45.

Further, the coolant ejection member 37 is disposed adjacent to the side of the flank 8 of the cutting insert 1 opposite to the cutting edge 5 in a direction parallel to the flank 8. Specifically, the coolant ejection member 37 is mounted in the housing recess 38, which is provided below the insert mounting portion 32 so as to be adjacent to the insert mounting portion 32, and is disposed adjacent to the side of the flank 8 of the cutting insert 1 opposite to the cutting edge 5 in the direction of the insert axis C (that is, the lower side of the flank 8 that is close to the seating surface from the face 7 in the direction of the insert axis C).

As shown in FIGS. 6 and 9 to 13, the coolant ejection member 37 includes a tubular portion 43 that is inserted into the hole portion 41 of the housing recess 38 and an ejection portion 44 that is disposed in the notched portion 42 of the housing recess 38.

Furthermore, the ejection portion 44 is provided with an ejection hole 46 that communicates with the coolant supply passage 36 through the inside of the tubular portion 43 and opens toward the flank 8 and the cutting edge 5 of the cutting insert 1. Moreover, since the flank 8 is positioned between the ejection hole 46 of the coolant ejection member 37 and the cutting edge 5, the ejection hole 46 is disposed adjacent to the flank 8.

In the example of this embodiment, the tubular portion 43 is a cylinder.

In longitudinal sectional view of FIG. 6 taken in the direction of the insert axis C, the tubular portion 43 extends so as to be gradually inclined toward the cutting edge 5 from the ejection hole 46 (that is, toward the face from the seating surface along the direction of the insert axis C, toward the upper side of the tool body 31) as approaching at least one of the leading end side and the lateral side of the tool body 31 (as approaching the leading end side and the lateral side in this embodiment) from a portion, which is connected to the coolant supply passage 36, of the tubular portion 43.

An end portion, which is connected to the coolant supply passage 36, of the inner peripheral surface of the tubular portion 43 has a tapered shape so as to be gradually increased in diameter as approaching the coolant supply passage 36.

Further, an annular seal member 47 is fitted to the outer periphery of the tubular portion 43. In the shown example, an O-ring made of a resin material is disposed in a groove 48, which is formed on the outer peripheral surface of the tubular portion 43, as the seal member 47. Furthermore, the seal member 47 is in close contact with the inner peripheral surface of the hole portion 41 of the housing recess 38.

In FIGS. 9 to 13, the ejection portion 44 has the shape of a plate of which the cross-section is formed in an L shape (or a V shape). An ejection hole 46 is formed on the upper surface of the ejection portion 44. In FIG. 6, the ejection hole 46 is formed so as to extend in the direction of the insert axis C.

In FIG. 9, the opening shape of the ejection hole 46 of this embodiment has an L shape as in the case of the shape of the upper surface, which has an L shape, of the ejection portion 44.

In detail, as shown in FIGS. 7 and 8, the opening shape of the ejection hole 46 is set so as to correspond to the shape of the cutting edge 5 of the cutting insert 1. Specifically, FIGS. 7 and 8 are top views of the cutting insert 1 and the ejection hole 46 seen in the direction of the insert axis C, and the cutting edge 5 of the cutting insert 1 is disposed above the ejection hole 46 (in the ejection hole 46) in the top views. The detailed shape of the cutting edge 5 will be described below in the description of the cutting insert 1.

Further, as shown in FIG. 2, the ejection portion 44 is disposed so as to retreat from the cutting edge 5 of the cutting insert 1 toward the inside of the tool body 31 (the inside of the base end side in the direction of the axis O and the lateral side) in the top view of the tool body 31 seen in the vertical direction.

In this embodiment, the cross-sectional shape of the ejection hole 46 is a substantially L shape that is constant in the direction of the insert axis C as shown in FIGS. 6, 9, and 13. However, the cross-sectional shape of the ejection hole 46 is not limited thereto, and the shape of an opening portion of the ejection hole 46, which is directed to at least the flank 8 and the cutting edge 5, may be set so as to correspond to the shape of the cutting edge 5.

Further, a portion of the ejection hole 46, other than a portion of the ejection hole 46 opening to the upper surface of the ejection portion 44 and a portion of the ejection hole 46 positioned at the lower end thereof and communicating with the tubular portion 43, is surrounded by a wall portion and is closed. That is, the ejection hole 46 is a flow passage for a coolant, which is formed in the ejection portion 44, and a portion of the ejection hole 46, other than the upper and lower end portions of the ejection hole 46, forms a chamber that is hermetically sealed by a wall portion.

Furthermore, as shown in FIGS. 10 and 12, notch recesses 49 to which the mounting screws 45 are locked are formed at both lateral end portions of the ejection portion 44.

[Indexable Insert]

As shown in FIGS. 5 to 7, the indexable insert 1 includes an insert body 2 that has the shape of a plate, the surface and the back 3 of the insert body 2, the outer peripheral surface 4 that connects the peripheral edges of the surface and the back 3 in the direction of the insert axis C, the cutting edge 5 that is formed at an intersection ridge portion between each of the surface and the back 3 and the outer peripheral surface 4, and a mounting hole 6 that is formed so as to pass through the insert body 2 in the direction of the insert axis C, opens to the surface and the back 3, and is locked to the clamp bridge 33 (the clamp mechanism).

In this embodiment, the insert body 2 of the indexable insert 1 has the shape of a substantially rhombic and rectangular plate, each of the surface and the back 3 have the shape of a substantially rhombic and rectangular surface, and the outer peripheral surface 4 includes four rectangular surfaces that are arranged in the circumferential direction of the insert.

Specifically, in FIGS. 5 and 7, each of corner portions of the outer peripheral end edges of the surface and the back 3 of the insert body 2 has the shape of a convex curve. Among the respective corner portions, each of corner portions positioned at a pair of corners, which has an acute angle, of the surface and the back 3 having a rhombic shape and the vicinity thereof form the cutting edge 5. Further, the mounting hole 6 opens to each of the central portions of the surface and the back 3 (so as to be coaxial with the insert axis C).

Furthermore, a portion of the outer peripheral surface 4 of the insert body 2 between the rectangular surfaces, which are adjacent to each other in the circumferential direction of the insert, is formed so as to have the shape of a convex surface (a portion of the outer peripheral surface of a cylindrical body in the shown example) of which the cross-section perpendicular to the insert axis C has the shape of a convex curve.

A portion, which includes an area adjacent to at least the cutting edge 5, of the surface 3, which faces the side opposite to the bottom wall 39 of the insert mounting portion 32 in a state in which the indexable insert 1 is mounted on the insert mounting portion 32 as shown in FIGS. 5 to 7, of the surface and the back 3 of the insert body 2 forms the face 7. Further, the back 3 (the face being in contact with the shim 35), which faces the bottom wall 39 of the insert mounting portion 32 in a state in which the indexable insert 1 is mounted on the insert mounting portion 32, of the surface and the back 3 of the insert body 2 forms the seating surface.

Furthermore, a portion, which includes an area adjacent to at least the cutting edge 5, of the outer peripheral surface 4 of the insert body 2 forms the flank 8.

The indexable insert 1 of this embodiment is a so-called negative insert of which the flank 8 of the insert body 2 (the outer peripheral surface 4) is formed in parallel to the insert axis C, but is not limited thereto. That is, the indexable insert 1 may be a so-called positive insert of which the flank 8 is gradually inclined inward in the radial direction of an insert as becoming distant from the cutting edge 5 in the direction of the insert axis C.

Further, the indexable insert 1 of this embodiment is an insert of which the surface and the back are symmetric with respect to each other, but is not limited thereto. That is, the indexable insert 1 may be a one-side insert or a both-side insert of which the surface and the back are asymmetric to each other (that is, the surface and the back are not symmetric to each other).

[Cutting Edge]

The cutting edge 5 of the indexable insert 1 is formed at the intersection ridge portion between the face 7 and the flank 8. As shown in FIGS. 5, 7, and 8, the cutting edge 5 includes a corner edge 9 that is positioned at a corner portion of each of the surface and the back 3 (the corner portion of the face 7), and a pair of linear edges 10 and 11 that is connected to both ends of the corner edge 9 and linearly extends. That is, the cutting edge 5 includes the corner edge 9, and a pair of linear edges 10 and 11 that continues to the corner edge 9 so that the corner edge 9 is interposed between the pair of linear edges in the circumferential direction of the insert. The corner edge 9 is disposed at an intermediate portion of the entire length of the cutting edge 5 (between the pair of linear edges 10 and 11).

The corner edge 9 has the shape of a convex curve, and has a convex circular arc shape in an example shown in this embodiment. A portion of the corner edge 9, which is positioned on the front side in a tool feed direction during turning, (a portion of the corner edge 9 positioned close to the linear edge 10) and the linear edge 10 cut the surface, which is to be machined, of the work material. Further, a portion of the corner edge 9, which is positioned on the rear side in the tool feed direction during turning, (a portion of the corner edge 9 positioned close to the linear edge 11) finishes the surface, which is to be machined, of the work material. The surface, which is to be machined, of the work material may be finished using the linear edge 11 that continues to the corner edge 9 on the rear side in the tool feed direction. Furthermore, the surface, which is to be machined, of the work material may be cut from the linear edge 11 of the cutting edge 5.

The linear edges 10 and 11 extend in tangential directions tangent to both ends of the corner edge 9 having a circular arc shape, and smoothly continue to each other at the corner edge 9. Further, an angle formed between the pair of linear edges 10 and 11 (an intersection angle between the virtual extension lines of the linear edges 10 and 11) is set to an acute angle smaller than 90° in this embodiment and is, for example, about 80°.

Furthermore, the indexable insert 1 of this embodiment is formed in a shape symmetric (mirror symmetric) with respect to a bisector (not shown) of an angle, which is formed between the pair of linear edges 10 and 11, as the axis of symmetry. Accordingly, the cutting edge 5 is also formed in a shape symmetric with respect to the bisector of the angle as the axis of symmetry, and the linear edges 10 and 11 have the same shape and the same length. However, the cutting edge 5 is not limited thereto, and may not be formed in a shape symmetric with respect to the bisector of the angle as the axis of symmetry (that is, the cutting edge 5 may be formed in an asymmetric shape). Further, the linear edges 10 and 11 may have shapes or lengths that are different from each other.

It is preferable that portions of the indexable insert 1 positioned near at least the cutting edge 5 (the cutting edge 5, the face 7, and the flank 8) are coated with a hard film, such as a CVD coating film.

Furthermore, in a top view of FIG. 8 seen in the direction of the insert axis C, the ejection hole 46 of the coolant ejection member 37 has an L shape and is disposed in an area corresponding to the corner edge 9 and the linear edges 10 and 11 of the cutting edge 5 (immediately below the corner edge 9 and the linear edges 10 and 11 of the cutting edge 5).

Moreover, in the top view, an L-shaped virtual line V passing through the middle of the width of the L-shaped ejection hole 46 is disposed so that distances between the virtual line V and the corner edge 9 and the linear edges 10 and 11 of the cutting edge 5 are substantially constant (distances in a predetermined range). That is, in the top view of FIG. 8, the virtual line V passing through the middle of the width of the ejection hole 46 extends in a longitudinal direction of the cutting edge 5.

In this embodiment, the virtual line V is disposed on the inside of the cutting edge 5 in the radial direction of the insert in the top view of FIG. 8. Further, the virtual line V is closest to the cutting edge 5 at a portion of the cutting edge 5 corresponding to the corner edge 9 (specifically, at the central portion of the corner edge 9 in the longitudinal direction).

[Functional Effects of this Embodiment]

According to the above-mentioned tool holder 30 of this embodiment, the coolant ejection member 37 is disposed at the leading end portion of the tool body 31, and a coolant flowing in the coolant supply passage 36 is ejected to the flank 8 and the cutting edge 5 of the indexable insert 1 through the tubular portion 43 and the ejection hole 46 of the ejection portion 44 of the coolant ejection member 37.

Since the ejection hole 46 of the coolant ejection member 37 and the coolant supply passage 36 communicate with each other through the tubular portion 43 as described above, the leakage of a coolant from a portion other than the ejection hole 46 in an unintended direction is prevented.

In detail, since the tubular portion 43 of the coolant ejection member 37 surrounds a coolant, which flows therein, by the peripheral wall of the tubular portion 43, the leakage of the coolant to the outside from the peripheral wall is prevented. Further, the ejection hole 46 of the coolant ejection member 37 is an L-shaped "hole" and includes the annular peripheral edge of an opening unlike in the case of the notch, such as a recess, of the plate-like member of the tool holder in the related art disclosed in, for example, the above-mentioned PTL 1 (JP-A-10-76404). Since the annular peripheral edge of an opening is formed as described above, the leakage of a coolant from a portion other than the ejection hole 46 is prevented.

That is, since an area of the coolant ejection member 37 between a portion, which is connected to the coolant supply passage 36, of the coolant ejection member 37 and the ejection hole 46 forms a hermetically sealed flow passage (chamber), the coolant ejection member 37 can effectively prevent the unintended leakage of a coolant.

Therefore, according to this embodiment, a sufficient amount of a coolant can be efficiently supplied to the flank 8 and the cutting edge 5 without an increase in the amount of a coolant to be supplied.

Further, since the coolant ejection member 37 is detachably provided at the leading end portion of the tool body 31, the following significant functional effects are obtained.

That is, in a case in which the indexable insert 1 including the cutting edge 5 is detachably mounted on the leading end portion of the tool body 31 (the case of the tool holder 30) as in this embodiment, a plurality of kinds of coolant ejection members 37 including ejection holes 46 having shapes, disposition, sizes, and the like different from each other can be prepared so as to correspond to the shapes of various cutting edges 5 of a plurality of kinds of indexable inserts 1 or the types of cutting (hereinafter, omitted together with the shape of the cutting edge 5 and the like). Furthermore, a predetermined coolant ejection member 37 suitable for the shape of a predetermined cutting edge 5 can be selected from these coolant ejection members 37 and can be mounted on the tool body 31.

Here, variations of the shape of the cutting edge 5 of the indexable insert 1 and the shape of the ejection hole 46 corresponding to the shape of the cutting edge 5 will be described using modification examples of this embodiment.

In a modification example shown in FIGS. 14 and 15, the cutting edge 5 of the indexable insert 1 has a circular arc shape in a top view seen in the direction of the insert axis C. Specifically, in this modification example, the corner R of a corner portion of a face 7 (that is, the radius of curvature of a corner edge 9) is set to be larger than that of the cutting edge 5 described in the above-mentioned embodiment.

In contrast, the ejection hole 46 has a circular arc shape in top view (cross-sectional view). In detail, in a top view of FIG. 15 seen in the direction of the insert axis C, the ejection hole 46 of the coolant ejection member 37 is disposed in an area corresponding to the corner edge 9 and the linear edges 10 and 11 of the cutting edge 5 (immediately below the corner edge 9 and the linear edges 10 and 11 of the cutting edge 5).

Further, in this top view, a circular arc-shaped virtual line V passing through the middle of the width of a circular arc-shaped ejection hole 46 is disposed so that distances between the virtual line V and the corner edge 9 and the linear edges 10 and 11 of the cutting edge 5 are substantially constant (distances in a predetermined range). That is, in the top view of FIG. 15, the virtual line V passing through the middle of the width of the ejection hole 46 extends in a longitudinal direction of the cutting edge 5.

In this modification example, in the top view of FIG. 15, the virtual line V intersects the cutting edge 5 at portions of the corner edge 9 that are positioned between both end portions of the corner edge 9 in the longitudinal direction and the central portion of the corner edge 9.

Furthermore, the virtual line V is disposed on the outside of the cutting edge 5 in the radial direction of the insert near the central portion of the corner edge 9, and is disposed on the inside of the cutting edge 5 in the radial direction of the insert at portions other than the central portion of the corner edge 9.

Since a coolant, which is ejected from the ejection hole 46, is also accurately and efficiently supplied to the entire area of the flank 8 and the cutting edge 5 in the longitudinal direction by this modification example, the above-mentioned functional effects of this embodiment can be obtained significantly.

Further, in a modification example shown in FIG. 16, in this top view, the ejection hole 46 of the coolant ejection member 37 is disposed in an area corresponding to the corner edge 9 and the linear edges 10 and 11 of the cutting edge 5 (immediately below the corner edge 9 and the linear edges 10 and 11 of the cutting edge 5), but the virtual line V passing through the middle of the width of the ejection hole 46 does not extend in the longitudinal direction of the cutting edge 5.

The above-mentioned functional effects of this embodiment can also be obtained in this modification example. However, as the middle portion of the ejection hole 46 in the extending direction of the virtual line V is disposed so as to be more distant from the corner edge 9 of the cutting edge 5 toward the inside in the radial direction of the insert in a top view of FIG. 16, the amount of a coolant, which is not used to cool the flank 8 and the cutting edge 5, is increased. For this reason, a coolant is used wastefully. Accordingly, it is more difficult for effects to be obtained than the modification example described with reference to FIG. 15.

Furthermore, even in a modification example shown in FIG. 17, a virtual line V passing through the middle of the width of the ejection hole 46 does not extend in the longitudinal direction of the cutting edge 5 in a top view. Since the ejection hole 46 is disposed so as to be significantly distant from the corner edge 9 of the cutting edge 5 toward the inside in the radial direction of the insert in this modification example, the opening portion of the ejection hole 46 may be closed by the shim 35.

Accordingly, it is preferable that the virtual line V passing through the middle of the width of the ejection hole 46 extends along the corner edge 9 and the linear edges 10 and 11 of the cutting edge 5 in a top view in which the front face of the face 7 is seen in the direction of the insert axis C.

Further, in a modification example shown in FIGS. 18 and 19, in a top view of FIG. 19 (a top view seen in the direction of the insert axis C), the ejection hole 46 of the coolant ejection member 37 has an I shape and is disposed in an area corresponding to a portion of the cutting edge 5 that is adjacent to at least the linear edge 11 of the linear edge 11 and the corner edge 9 (immediately below the portion of the cutting edge 5 adjacent to the linear edge 11 and the corner edge 9).

Furthermore, in the top view of FIG. 19, an I-shaped (linear) virtual line V passing through the middle of the width of the I-shaped ejection hole 46 is disposed so that a distance between the virtual line V and the linear edge of the cutting edge 5 is substantially constant (a distance in a predetermined range). That is, in the top view of FIG. 19, the virtual line V passing through the middle of the width of the ejection hole 46 extends in a longitudinal direction of the cutting edge 5. Further, the virtual line V is disposed on the inside of the linear edge 11 in the radial direction of the insert.

In this modification example, in the top view of FIG. 19, the virtual line V intersects the cutting edge 5 at a portion of the corner edge 9 that is positioned between an end portion of the corner edge 9 in the longitudinal direction (an end portion, which is close to the linear edge 11, of the corner edge 9) and the central portion of the corner edge 9.

According to the modification example of FIGS. 18 and 19, since a coolant, which is ejected from the ejection hole 46, is accurately and efficiently supplied to portions, which are positioned close to the linear edge 11 and a portion of the corner edge 9 close to the linear edge 11, of the flank 8 and the cutting edge 5, the above-mentioned functional effects of this embodiment are obtained.

Furthermore, in a modification example shown in FIGS. 20 and 21, in a top view of FIG. 21 (a top view seen in the direction of the insert axis C), the ejection hole 46 of the coolant ejection member 37 has an I shape and is disposed in an area corresponding to a portion of the cutting edge 5 that is adjacent to at least the linear edge 10 of the linear edge 10 and the corner edge 9 (immediately below the portion of the cutting edge 5 adjacent to the linear edge 10 and the corner edge 9).

Further, in the top view of FIG. 21, an I-shaped (linear) virtual line V passing through the middle of the width of the I-shaped ejection hole 46 is disposed so that a distance between the virtual line V and the linear edge of the cutting edge 5 is substantially constant (a distance in a predetermined range). That is, in the top view of FIG. 21, the virtual line V passing through the middle of the width of the ejection hole 46 extends in a longitudinal direction of the cutting edge 5. Furthermore, the virtual line V is disposed on the inside of the linear edge 10 in the radial direction of the insert.

In this modification example, in the top view of FIG. 21, the virtual line V intersects the cutting edge 5 at a portion of the corner edge 9 that is positioned between an end portion of the corner edge 9 in the longitudinal direction (an end portion, which is close to the linear edge 10, of the corner edge 9) and the central portion of the corner edge 9.

According to the modification example of FIGS. 20 and 21, since a coolant, which is ejected from the ejection hole 46, is accurately and efficiently supplied to portions, which are positioned close to the linear edge 10 and a portion of the corner edge 9 close to the linear edge 10, of the flank 8 and the cutting edge 5, the above-mentioned functional effects of this embodiment are obtained.

According to this embodiment, a coolant ejection member 37 having the shape of the ejection hole 46 optimum for the shapes and the like of various cutting edges 5 can be used.

Accordingly, a coolant can be accurately and stably supplied to the flank 8 and the cutting edge 5 regardless of the shape and the like of the cutting edge 5. Therefore, cooling efficiency near the cutting edge 5 can be improved. Accordingly, effects, such as the improvement of cutting accuracy, an increase in the efficiency of cutting, and the extension (lengthening) of the life of a tool, can be expected.

Further, since the flank 8 is positioned between the ejection hole 46 of the coolant ejection member 37 and the cutting edge 5 in this embodiment, the ejection hole 46 is disposed adjacent to the flank 8. That is, since the ejection hole 46 of the coolant ejection member 37 is disposed below the flank 8 (a direction directed to the seating surface from the face 7 in the direction of the insert axis C) so as to be adjacent (close) to the flank 8 at the leading end portion of the tool body 31, a distance between the ejection hole 46 of the coolant ejection member 37 and the flank 8 and a distance between the ejection hole 46 of the coolant ejection member 37 and the cutting edge 5 can be reduced.

Accordingly, the above-mentioned effect of accurately supplying a coolant to the flank 8 and the cutting edge 5 is more significant.

Furthermore, in this embodiment, in longitudinal sectional view of FIG. 6 taken in the direction of the insert axis C, the tubular portion 43 extends so as to be gradually inclined toward the cutting edge 5 from the ejection hole 46 (that is, toward the upper side of the tool body 31) as approaching at least one of the leading end side and the lateral side of the tool body 31 from a portion, which is connected to the coolant supply passage 36, of the tubular portion 43. Accordingly, the following functional effects are obtained.

That is, according to the above-mentioned structure, the tubular portion 43 extends so as to be inclined, the tubular portion 43 and the coolant supply passage 36 are connected to each other at a gentle angle so as to intersect each other at an obtuse angle, and the tubular portion 43 and the ejection hole 46 are connected to each other at a gentle angle so as to intersect each other at an obtuse angle. Accordingly, the pressure loss of a coolant flowing in the tubular portion 43, the coolant supply passage 36, and the ejection hole 46 can be reduced. Therefore, since it is possible to prevent coolant supply pressure from being reduced in the tool holder 30, it is possible to further improve the efficiency of the supply of a coolant to the flank 8 and the cutting edge 5.

Further, since the annular seal member 47, such as an O-ring, is fitted to the outer periphery of the tubular portion 43 in this embodiment, it is possible to prevent a coolant from flowing on the outer periphery of the tubular portion 43 and to prevent the coolant from leaking to the outside, such as the leading end side or the lateral side of the tool. Therefore, it is easy to more significantly obtain the above-mentioned functional effects of this embodiment.

Furthermore, since the contact resistance between the tubular portion 43 and the hole portion 41 of the tool body 31 in which the tubular portion 43 is disposed is increased by the seal member 47, the easy separation of the coolant ejection member 37 from the tool body 31, which is caused by coolant supply pressure or the like, is suppressed. That is, an action for retaining the coolant ejection member 37 can be obtained by the seal member 47, and the mounting screws 45 may not be provided in a case in which this action is sufficiently obtained.

Moreover, since the housing recess 38, which communicates with the coolant supply passage 36, is formed at the leading end portion of the tool body 31 and the coolant ejection member 37 is housed in the housing recess in this embodiment, the following functional effects are obtained.

That is, according to the above-mentioned structure, since the coolant ejection member 37 is housed in the housing recess 38, the significant projection (protrusion) of the tool body 31 from the leading end portion is suppressed.

Accordingly, while the above-mentioned significant functional effects are obtained by the coolant ejection member 37, the tool holder 30 can be made compact and a situation in which the conditions of turning are limited since the coolant ejection member 37 is mounted can also be prevented.

Second Embodiment

Next, a tool holder 60 according to a second embodiment of the invention will be described with reference to FIGS. 22 to 25.

The detailed description of the same components as the components of the above-mentioned embodiment (first embodiment) will be omitted and only differences between the components of the second embodiment and the components of the first embodiment will be described below.

As shown in FIG. 22, the tool holder 60 of the second embodiment uses a coolant ejection member 61, at which the notch recesses 49 are not formed, instead of the coolant ejection member 37 described in the first embodiment. Further, the tool holder 60 does not include the mounting screws 45.

The tool holder 60 of this embodiment has a separation regulating structure (retaining structure) that can prevent the separation of the coolant ejection member 61 from the housing recess 38 without using the mounting screws 45.

[Separation Regulating Structure]

The separation regulating structure will be described.

As shown in FIGS. 23 and 24, the tool holder 60 is adapted to be capable of regulating the separation of the coolant ejection member 61 from the housing recess 38 by setting a retreat distance (overhang distance) X to a predetermined range and setting an interval Y to a predetermined range. The retreat distance (overhang distance) X is a distance in which an inner end of the upper surface of the ejection portion 44 of the coolant ejection member 61 in the radial direction of the insert retreats from a surface, which faces the outside in the radial direction of the insert, of the outer peripheral surface of the shim 35 in the radial direction of the insert; and the interval Y is a distance between the upper surface of the ejection portion 44 and the lower surface of the shim 35 in the direction of the insert axis C.

Specifically, for example, it is preferable that the overhang distance X has a value exceeding 0 mm and the interval Y is in the range of 0 to 0.2 mm. That is, the separation regulating structure regulates the separation of the coolant ejection member 61 from the housing recess 38 by setting the overhang distance X and the interval Y to the predetermined ranges.

In details, when the overhang distance X and the interval Y are set to the predetermined ranges and the tubular portion 43 of the coolant ejection member 61 is moved along the central axis thereof from the hole portion 41 to the outside in the radial direction of the insert, the upper surface of the ejection portion 44 comes into contact with the lower surface of the shim 35. Accordingly, the further movement (that is, separation) of the coolant ejection member 61 relative to the housing recess 38 to the outside in the radial direction of the insert along the direction of the central axis of the tubular portion 43 is regulated.

In order to obtain the function of the separation regulating structure, the coolant ejection member 61 may be mounted in the housing recess 38 as described below.

First, in a state in which the indexable insert 1 and the shim 35 are removed from the insert mounting portion 32 before turning, the coolant ejection member 61 is mounted on the housing recess 38 while the tubular portion 43 of the coolant ejection member 61 is inserted into the hole portion 41 of the housing recess 38.

After the coolant ejection member 61 is mounted in the housing recess 38, the indexable insert 1 and the shim 35 are mounted on the insert mounting portion 32.

During turning, a coolant is made to flow into the coolant ejection member 61 through the coolant supply passage 36. At this time, a force in a direction shown in FIG. 24 by a void arrow (a direction directed to the outside in the radial direction of the insert in a direction along the central axis of the tubular portion 43) acts on the coolant ejection member 61 by coolant supply pressure. Accordingly, the coolant ejection member is to move relative to the housing recess 38 in a direction shown by a void arrow.

Since the overhang distance X and the interval Y are set as described above at this time, the upper surface of the ejection portion 44 of the coolant ejection member 61 comes into contact with the lower surface of the shim 35. Accordingly, the further separation of the coolant ejection member 61 from the housing recess 38 is prevented.

[Functional Effects of this Embodiment]

According to the tool holder 60 of this embodiment, the same functional effects as the functional effects of the above-mentioned embodiment can be obtained.

In addition, since the mounting screws 45 are not required, the number of parts can be reduced. Further, the shape of the coolant ejection member 61 can be simplified.

In the tool holder 60 of this embodiment, a seat recess 62, which can house the upper surface of the ejection portion 44 of the coolant ejection member 61, may be formed on the lower surface of the shim 35 as shown in FIG. 25.

In this case, since distances between the ejection hole 46 and the flank 8 and the cutting edge 5 can be further reduced, the above-mentioned functional effects are more significant.

[Other Structure Included in the Invention]

The invention is not limited to the above-mentioned embodiments, and may be modified in various ways without departing from the scope of the invention.

For example, the indexable insert 1 has been formed in the shape of a substantially rhombic and rectangular plate in the above-mentioned embodiments, but is not limited thereto. That is, the indexable insert 1 may have the shape of a polygonal plate other than the shape of a rectangular plate.

Further, the indexable insert 1 has been made of a hard material, such as cemented carbide, and portions of the outer surface of the indexable insert 1 positioned near at least the cutting edge 5 (the cutting edge 5, the face 7, and the flank 8) have been coated with a hard film, such as a CVD coating film in the above-mentioned embodiments. However, the invention is not limited thereto. That is, the indexable insert 1 may be an insert in which a cutting edge chip formed of a super-high hardness sintered body, such as a PCD (polycrystalline diamond) sintered body or a cBN (cubic boron nitride) sintered body, is integrally formed in a recess formed at a corner portion of base metal (base material) made of, for example, cemented carbide by brazing or the like. In this case, the cutting edge 5, the face 7, and the flank 8 of the indexable insert 1 are formed on the cutting edge chip.

Furthermore, the shim 35 has been interposed between the back 3 of the indexable insert 1 and the bottom wall 39 of the insert mounting portion 32 in the above-mentioned embodiments, but the shim 35 may not be provided. In this case, the back 3 of the indexable insert 1 is directly seated on the bottom wall 39 of the insert mounting portion 32. Further, in the second embodiment, the upper surface of the ejection portion 44 comes into contact with the back 3 of the indexable insert 1 instead of the lower surface of the shim 35.

Furthermore, the tool holders 30 and 60 have been described as a tool holder by way of example in the above-mentioned embodiments, but are not limited thereto. That is, the invention can be applied to, for example, a tool holder, such as a brazing tool holder, which is not a tool holder.

The above-mentioned embodiments, the above-mentioned modification examples, and the respective structures (components) described in the additional note and the like may be combined and structures can be added, omitted, substituted, and modified without departing from the scope of the invention. Further, the invention is not limited by the above-mentioned embodiments, and is limited by only claims.

REFERENCE SIGNS LIST

5: cutting edge
7: face
8: flank
30, 60: tool holder
31: tool body
36: coolant supply passage
37, 61: coolant ejection member
38: housing recess
43: tubular portion
46: ejection hole
47: seal member

The invention claimed is:

1. A tool holder including a shaft-shaped tool body having a leading end portion on which is disposed a detachable cutting insert having a face, a flank, and a cutting edge forming an intersection ridge between the face and the flank,
wherein an insert mounting portion, which has a shape of a recess, is formed so as to be notched corresponding to a shape of the cutting insert;
a coolant supply passage is formed in the tool body,
a coolant ejection member is detachably provided at the leading end portion of the tool body, and
the coolant ejection member includes a tubular portion, and an ejection hole that communicates with the coolant supply passage through the inside of the tubular portion and opens toward the flank and the cutting edge, and an ejection portion that is provided with the ejection hole,
the tubular portion extends within the coolant ejection member so as to be inclined toward the cutting edge, with the ejection hole approaching at least one of a leading end side or a lateral side of the tool body, which is connected to the coolant supply passage,
and the ejection portion is disposed in a housing recess including a notched portion formed in a shape corresponding to the ejection portion, and the notched portion opens to a bottom wall of the insert mounting portion at the leading end portion of the tool body.

2. The tool holder according to claim 1,
wherein the flank is positioned between the ejection hole of the coolant ejection member and the cutting edge, and
the ejection hole is disposed adjacent to the flank.

3. The tool holder according to claim 2,
wherein an annular seal member is fitted to an outer periphery of the tubular portion.

4. The tool holder according to claim 2,
wherein a housing recess, which communicates with the coolant supply passage, is formed at the leading end portion of the tool body, and
the coolant ejection member is housed in the housing recess.

5. The tool holder according to claim 1,
wherein an annular seal member is fitted to an outer periphery of the tubular portion.

6. The tool holder according to claim 5,
wherein a housing recess, which communicates with the coolant supply passage, is formed at the leading end portion of the tool body, and
the coolant ejection member is housed in the housing recess.

7. The tool holder according to claim 1,
wherein a housing recess, which communicates with the coolant supply passage, is formed at the leading end portion of the tool body, and
the coolant ejection member is housed in the housing recess.

8. A tool holder including a shaft-shaped tool body having a leading end portion on which is disposed a detachable cutting insert having a face, a flank, and a cutting edge forming an intersection ridge between the face and the flank,
wherein an insert mounting portion, which has a shape of a recess, is formed so as to be notched corresponding to a shape of the cutting insert;
a coolant supply passage is formed in the tool body,
a coolant ejection member is detachably provided at the leading end portion of the tool body,
the coolant ejection member includes a tubular, portion, an ejection hole that communicates with the coolant supply passage through the inside of the tubular portion and opens toward the flank and the cutting edge, and an ejection portion that is provided with the ejection hole, the tubular portion extends within the coolant ejection member so as to be inclined toward the cutting edge, with the ejection hole approaching at least one of a leading end side or a lateral side of the tool body, which is connected to the coolant supply passage, and the ejection portion is disposed in a housing recess including a notched portion formed in a shape corresponding to the ejection portion, and the notched portion opens to a bottom wall of the insert mounting portion at the leading end portion of the tool body, and the tubular portion of the coolant ejection member is configured to move along a central axis of the tubular portion from the coolant supply passage toward the flank and the cutting edge, the upper surface of the ejection portion corning into contact with the bottom wall of the insert, in response to coolant supply pressure acting on the coolant ejection member.

9. The tool holder of claim 8, wherein movement of the coolant ejection member in response to the coolant supply pressure acting on the coolant ejection member, is limited by an overhang distance of the bottom wall of the insert above the notched portion, to a predetermined range.

* * * * *